United States Patent
Sugahara et al.

(10) Patent No.: US 6,239,777 B1
(45) Date of Patent: May 29, 2001

(54) DISPLAY DEVICE

(75) Inventors: Atsushi Sugahara; Kazuyuki Sunohara, both of Yokohama; Haruhiko Okumura, Fujisawa, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/119,390

(22) Filed: Jul. 21, 1998

(30) Foreign Application Priority Data

Jul. 22, 1997 (JP) .................................. 9-195739

(51) Int. Cl.⁷ .............................. G09G 3/34; G02B 5/08
(52) U.S. Cl. ............................................ 345/85; 359/227
(58) Field of Search ................................... 345/7, 31, 48, 345/84, 85, 109; 359/223, 227, 230; 361/280; 340/815.62, 815.65

(56) References Cited

U.S. PATENT DOCUMENTS

| | | | | |
|---|---|---|---|---|
| 3,924,228 | * | 12/1975 | Goodrich | 345/48 |
| 4,248,501 | * | 2/1981 | Simpson | 359/227 |
| 4,336,536 | * | 6/1982 | Kalt et al. | 345/85 |
| 4,420,896 | * | 12/1983 | Castleberry | 40/427 |
| 4,420,897 | * | 12/1983 | Castleberry | 40/427 |
| 4,564,836 | * | 1/1986 | Vuilleumier et al. | 345/85 |
| 4,831,371 | * | 5/1989 | Hata | 345/85 |
| 4,891,635 | * | 1/1990 | Hata | 345/85 |
| 5,638,084 | * | 6/1997 | Kalt | 345/31 |
| 5,943,033 | * | 8/1999 | Sugahara et al. | 345/85 |

FOREIGN PATENT DOCUMENTS

| | | | |
|---|---|---|---|
| 64-72195 | 3/1989 | (JP) | G09F/9/37 |
| 64-72196 | 3/1989 | (JP) | G09F/9/37 |
| 1-108598 | 4/1989 | (JP) . | |
| 4-12391 | 1/1992 | (JP) | G09F/9/37 |

* cited by examiner

Primary Examiner—Bipin Shalwala
Assistant Examiner—Jeff Piziali
(74) Attorney, Agent, or Firm—Finnegan, Henderson, Farabow, Garrett & Dunner, L.L.P.

(57) ABSTRACT

A display device includes a light guiding fixed electrode portion formed of a transparent material for guiding light incident from an exterior to the surface portion having a transparent conductive layer and then emitting the light, a flexible conductive light shielding plate arranged to face the transparent conductive layer of the light guiding fixed electrode portion and having one end fixed to pass the emitted light therethrough, and an electrostatic force generating circuit for applying a potential difference between the conductive light shielding plate and the transparent conductive layer to generate electrostatic force between the transparent conductive layer and the conductive light shielding plate, wherein the conductive light shielding plate is displaced according to the electrostatic force with one end thereof set as an axis to shield the surface portion of the light guiding fixed electrode portion when the potential difference is applied between the conductive light shielding plate and the transparent conductive layer.

14 Claims, 25 Drawing Sheets

| | THICKNESS | APPLICABLE SCREEN SIZE (INCH) 70  40  10  0 | PRICE FOR LARGE SCREEN | MULTISCREEN FEASIBILITY | BRIGHTNESS | POWER CONSUMPTION |
|---|---|---|---|---|---|---|
| CRT | LARGE | — | HIGH | INFERIOR | ACCEPTABLE | HIGHER |
| PDP | ACCEPTABLE | — | HIGH | INFERIOR | INFERIOR | HIGHER |
| PALC | ACCEPTABLE | — | HIGH | INFERIOR | INFERIOR | HIGHER |
| LCD | ACCEPTABLE | — | HIGHER | INFERIOR | INFERIOR | ACCEPTABLE |
| FED | ACCEPTABLE | — | HIGHER | INFERIOR | ACCEPTABLE | HIGH |
| LED | ACCEPTABLE | — | HIGHER | ACCEPTABLE | INFERIOR | HIGH |

FIG. 1 PRIOR ART

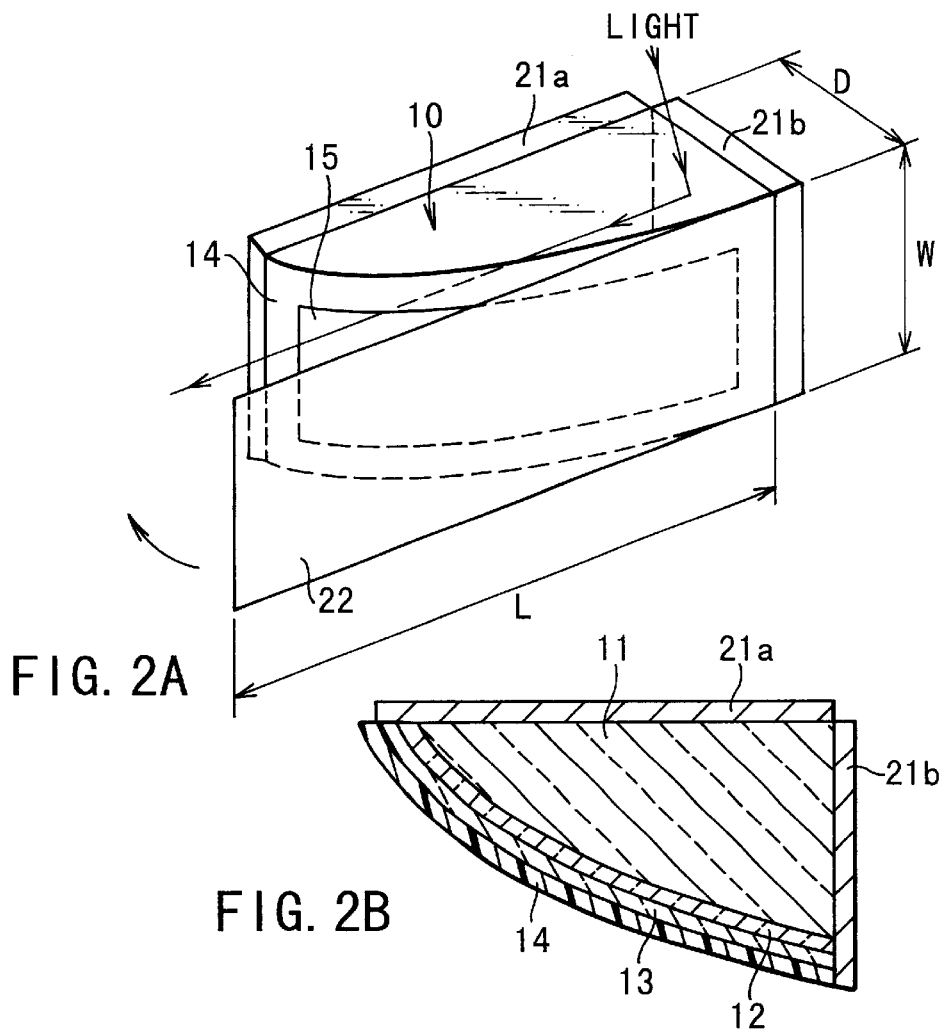
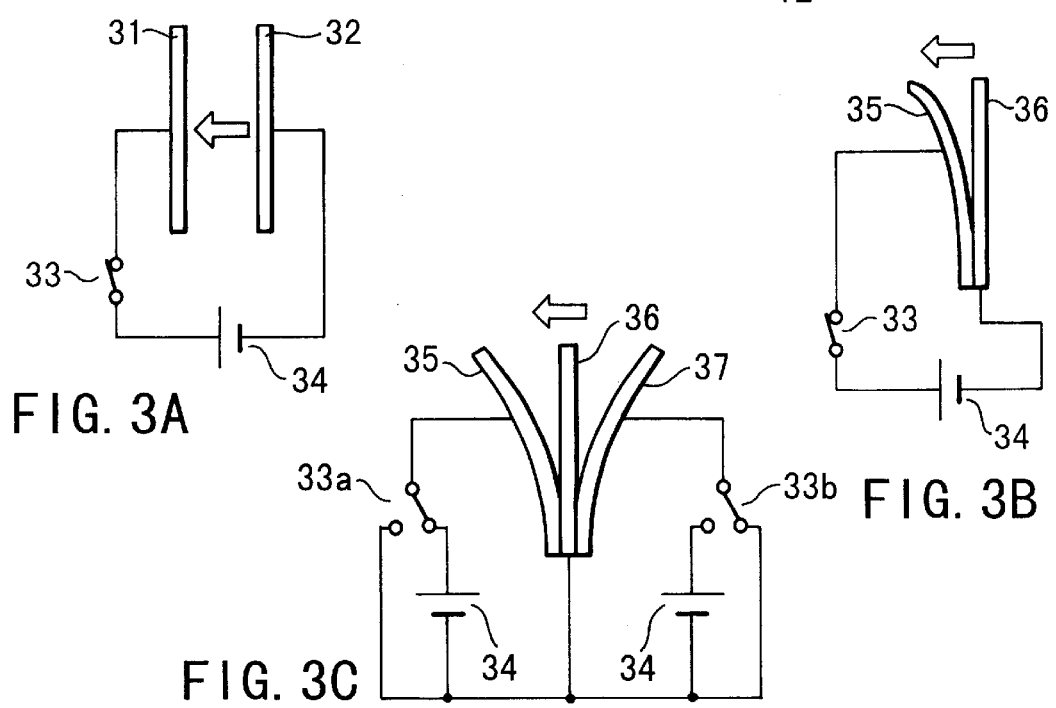

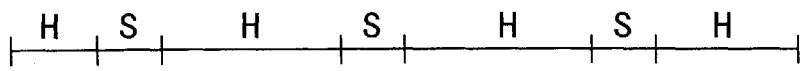
FIG. 10A
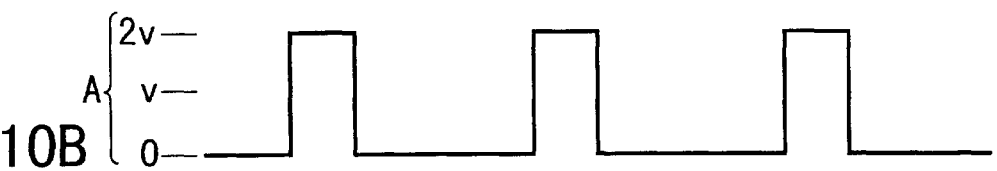
FIG. 10B
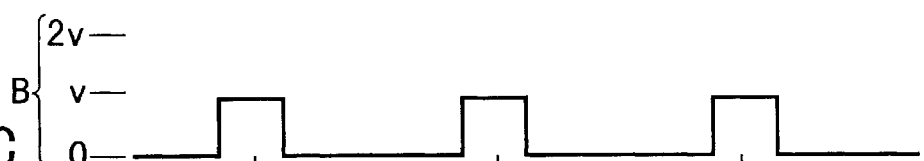
FIG. 10C
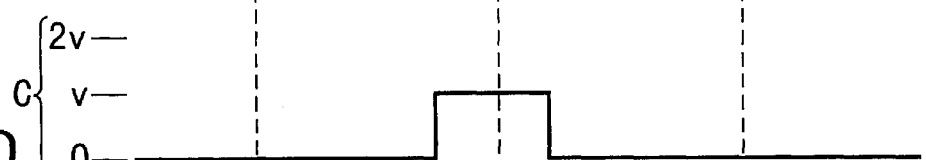
FIG. 10D
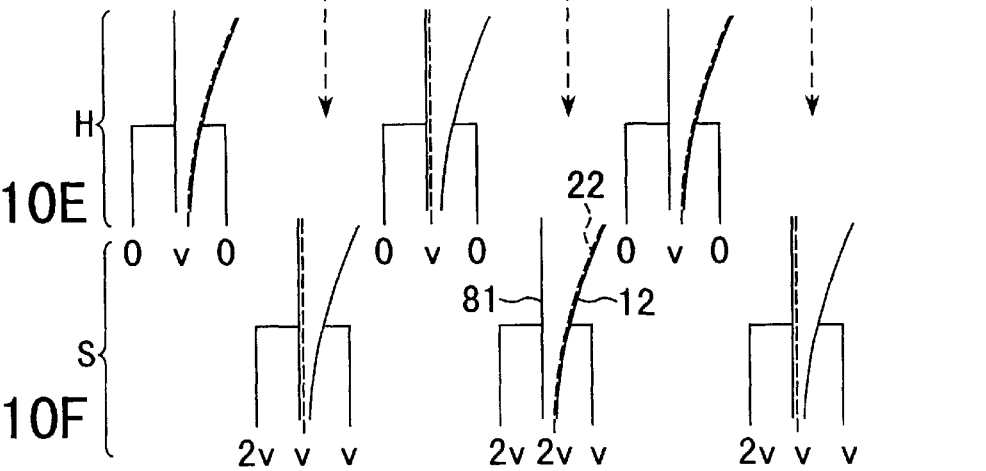
FIG. 10E
FIG. 10F

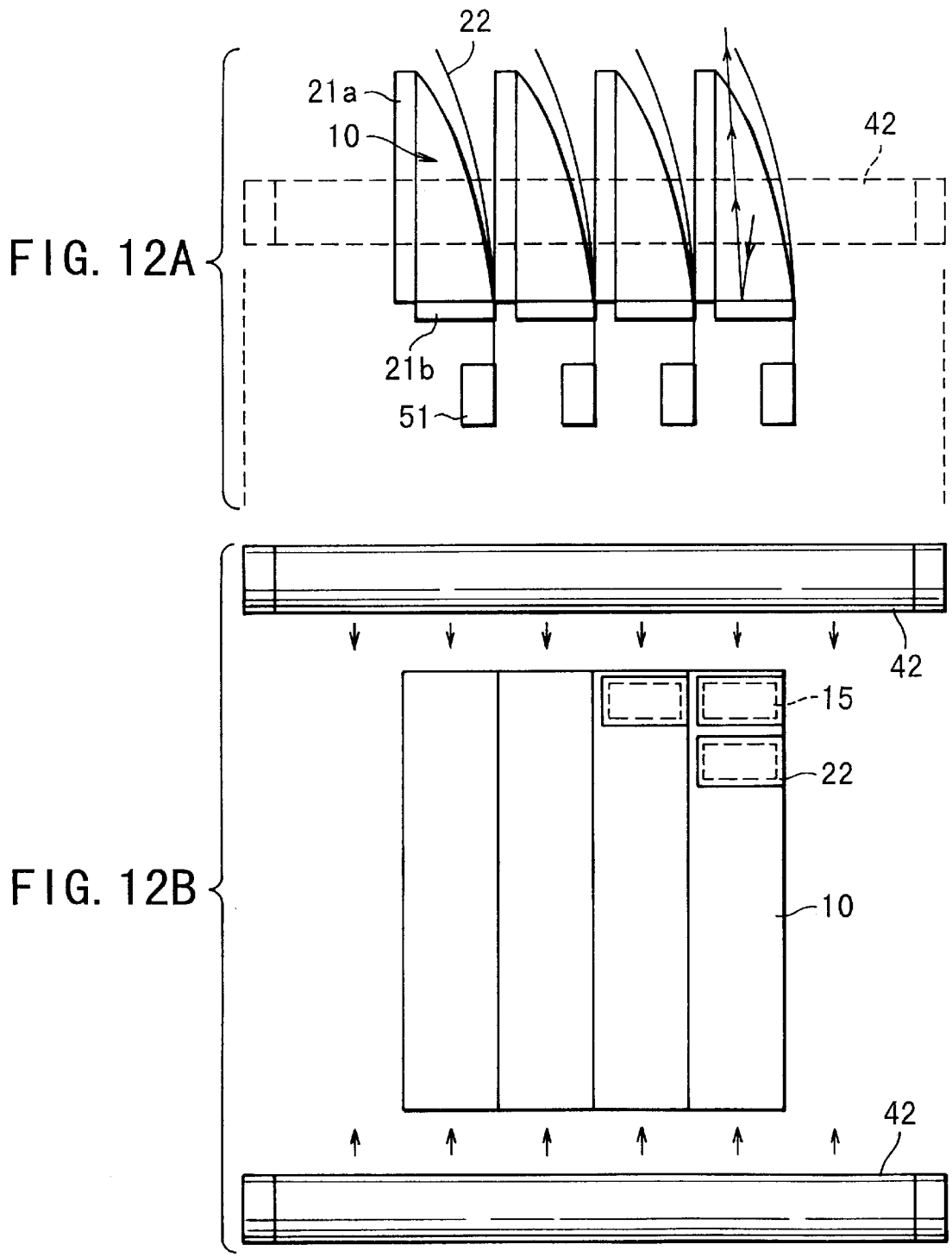

FIG. 34

| SCANNING LINE VOLTAGE | | SIGNAL LINE VOLTAGE | |
|---|---|---|---|
| | | Vc+Vma | Vc-Vma |
| HOLDING PERIOD | Va=GND<br>Vb=GND | PIXEL STATUS NO CHANGE | PIXEL STATUS NO CHANGE |
| SELECTED PERIOD (WRITE-IN) | TRANSMISSION<br>Va=Vc+Vma<br>Vb=GND | TRANSMISSION MOVABLE ELECTRODE DRAWN TO 2ND FIXED ELECTRODE | PIXEL STATUS NO CHANGE |
| | NON-TRANSMISSION<br>Va=GND<br>Vb=Vc+Vma | NON-TRANSMISSION MOVABLE ELECTRODE DRAWN TO 1ST FIXED ELECTRODE | PIXEL STATUS NO CHANGE |

Va: VOLTAGE OF SCANNING LINE a
Vb: VOLTAGE OF SCANNING LINE b

FIG. 37

| SCANNING LINE VOLTAGE | | SIGNAL LINE VOLTAGE | |
|---|---|---|---|
| | | Vc+Vma | Vc-Vma |
| HOLDING PERIOD | Va=Vhold<br>Vb=Vhold | PIXEL STATUS NO CHANGE | PIXEL STATUS NO CHANGE |
| SELECTED PERIOD (WRITE-IN) | TRANSMISSION<br>Va=Vc+Vma<br>Vb=GND | TRANSMISSION MOVABLE ELECTRODE DRAWN TO 2ND FIXED ELECTRODE | PIXEL STATUS NO CHANGE |
| | NON-TRANSMISSION<br>Va=GND<br>Vb=Vc+Vma | NON-TRANSMISSION MOVABLE ELECTRODE DRAWN TO 1ST FIXED ELECTRODE | PIXEL STATUS NO CHANGE |

Va: VOLTAGE OF SCANNING LINE a
Vb: VOLTAGE OF SCANNING LINE b

DISPLAY DEVICE

BACKGROUND OF THE INVENTION

This invention relates to a display device for displaying an image or the like by use of electrostatic force.

At present, a large-scale image display device has received much attention. FIG. 1 shows various types of conventional large-scale display devices for comparison. In FIG. 1, the expandability indicates whether or not a large screen can be easily formed by combining small displays.

Next, individual displays are explained. A CRT (Cathode Ray Tube) is a most widely used display device, but it is technically difficult to form a thin type and large display device of 40 inches or more. Further, since a large display device becomes relatively heavy, it becomes difficult to handle. Further, there is provided a display technique for combining small CRTs, but it is difficult to completely eliminate the boundary lines.

A PDP (Plasma Display Panel) has received much attention as a thin type display of 40-inch size, but it has problems that the maximum luminance thereof is lower than that of the CRT, the power consumption is large and the manufacturing cost is high and hard to be even 70 U.S. dollars for one inch. Further, when a display of larger size is formed, the manufacturing cost will be at least doubled. This is because the manufacturing line is constructed in accordance with the display size which will become most popularized. When a display of 40 inches or more is formed by combining small displays, the boundary lines become noticeable since the PDP is of a low-pressure gas-filed type and the peripheral wall cannot be made small.

A PALC (Plasma Addressing Liquid Crystal) is a combination of a liquid crystal cell and plasma generation electrodes. That is, a plasma generation cell is formed separately from the liquid crystal cell and the two cells are stacked together. The plasma cell has a function of selecting one or some of the pixels in the liquid crystal cell to which the potential is applied. It is said that the display of a large area can be attained at a low cost in comparison with the selecting system using the conventional TFTs (Thin Film Transistors). However, in this type of display, since the manufacturing line is constructed in accordance with a specified size (for example, 40 inches) as in the case of PDP, the manufacturing cost is abruptly raised if the display size is increased. Further, like the PDP, the boundary lines become noticeable when it is formed by combining small displays.

In the case of LCD (Liquid Crystal Display), the maximum size thereof is 20 inches at present and is 30 inches even if the combination technique is used. Further, the manufacturing cost will be made high if it is made large since TFTs are used.

An FED (Field Emission Display) is a system in which fine cold cathodes for emitting electrons are arranged on a silicon substrate or glass substrate and electrons emitted from the cold cathodes are applied to a fluorescent material for display. It is said that the maximum luminance which is almost equal to that of the CRT can be attained in this system, but it is difficult to uniformly form the cold cathodes on the large substrate and it is difficult to form a large screen display.

An LED (Light Emitting Diode) display is a large display formed by arranging a large number of light emitting diodes. It is most widely used as a large and thin type display of 40 inches or more. However, the power consumption is large and the manufacturing cost is high. Further, since the light emitting diodes are used, the maximum luminance is not so high.

That is, in the conventional large and thin type display, a display which has high expandability and which can be formed at a low cost is not present.

Further, a movable film type display device in which an electric field is applied to a conductive plastic foil or metal foil to move the same as a shutter for display is provided (Jpn. Pat. Appln. KOKAI Publication No. 1-72195, Jpn. Pat. Appln. KOKAI Publication No. 1-72196, Jpn. Pat. Appln. KOKAI Publication No. 1-108598 and Jpn. Pat. Appln. KOKAI Publication No. 4-12391).

In the above display device, a light source such as an LED or electric lamp is inserted into a cylinder whose surface is coated with a transparent electrode and a conductive movable film is set to cover and conceal the cylinder. Then, a potential difference is applied between the cylinder and the movable film to displace the movable film so as to change the amount of light emitted from the cylinder.

It is considered that a thin type display device of low cost can be formed by use of the above display method. However, a concrete method for constructing a large display by use of the movable film type display device has not been provided.

BRIEF SUMMARY OF THE INVENTION

An object of this invention is to provide a display device which can attain large screen display by use of a movable film type display device and can be manufactured at a low cost.

In order to attain the above object, a display device according to a first aspect of this invention comprises a light guiding fixed electrode portion formed of a transparent material for guiding light incident from an exterior to a surface portion having a transparent conductive layer and then emitting the light; a flexible conductive light shielding plate arranged to face the transparent conductive layer of the light guiding fixed electrode portion and having one end fixed to pass the emitted light therethrough; and electrostatic force generating means for applying a potential difference between the conductive light shielding plate and the transparent conductive layer to generate electrostatic force between the transparent conductive layer and the conductive light shielding plate; wherein the conductive light shielding plate is displaced according to the electrostatic force with one end set as an axis to shield the surface portion of the light guiding fixed electrode portion when the potential difference is applied between the conductive light shielding plate and the transparent conductive layer.

The conductive light shielding plate includes a plurality of conductive light shielding plates arranged in rows and columns, the light guiding fixed electrode portion includes a plurality of light guiding fixed electrode portions respectively having a plurality of transparent conductive layers formed by arranging the transparent conductive layer in rows and columns, and the electrostatic force generating means can include means for applying an independent potential difference between each of the plurality of conductive light shielding plates and a corresponding one of the plurality of transparent conductive layers.

It is preferable to integrally form the plurality of light guiding fixed electrode portions arranged on the same row.

It is preferable to electrically connect the plurality of transparent conductive layers of the plurality of transparent light guiding fixed electrode portions arranged on the same row.

It is preferable that the surface portion of the transparent light guiding fixed electrode portion is curved.

It is preferable to form a light shielding frame on a periphery of the transparent conductive layer of the light guiding fixed electrode portion.

According to the display device of the first aspect of this invention, the conductive light shielding plate is displaced with the supporting point set as an axis by the electrostatic force caused when the potential difference is applied between the conductive light shielding plate and the transparent conductive layer. The area of the transparent conductive layer which is covered with the conductive light shielding plate varies according to the displacement amount of the conductive light shielding plate. Therefore, the amount of light emitted from the transparent conductive layer is changed and desired gray scale display can be attained by controlling the area of the transparent conductive layer which is covered with the conductive light shielding plate, that is, controlling the electrostatic force acting between the conductive light shielding plate and the transparent conductive layer.

Further, the display device can be manufactured by use of inexpensive members and the manufacturing cost can be suppressed.

The display device is of a system for effecting multi-color display using color filters and the color reproduction range is wide. The display device has a wider color reproduction range in comparison with those of the PDP, FED for providing display by use of a fluorescent material.

Unlike the LCD, since the deflection plate is not used, the light utilization efficiency is approximately 2.5 times higher than in the LCD and the low power consumption and the high luminance can be attained.

In this invention, the screen size can be freely set by arranging the basic display units in rows and columns. At this time, a large display device of low cost can be easily attained by electrically connecting adjacent transparent conductive layers used as the scanning line.

When a large screen display device is formed by combining display units, the pixel pitch is rough, and therefore, the boundary lines will not be visually recognized.

Further, since the surface of the transparent conductive layer which is arranged to face the conductive light shielding plate is curved, the area of the transparent conductive layer which is covered with the conductive light shielding plate can be easily controlled and the gray-scale display becomes easy.

Further, by use of a black matrix, leakage of light from the surroundings of pixels can be suppressed and the display characteristic can be enhanced.

A display device according to a second aspect of this invention comprises a plurality of optical shutter units including a plurality of plate-like fixed electrodes and a plurality of light shielding movable films of cantilever form respectively arranged to face the plurality of fixed electrodes so as to form light passing portions, respectively; and electrostatic force generating means for selectively generating electrostatic force between each of the plurality of fixed electrodes and a corresponding one of the plurality of movable electrodes to selectively bend the plurality of movable electrodes and selectively shield the light passing portions of the plurality of optical shutter units; wherein the plurality of optical shutter units construct a plurality of optical shutter sets each of which is constructed by an arbitrary number of optical shutter units arranged adjacent to one another, the plurality of fixed electrodes are electrically connected to one another, the plurality of movable electrodes are electrically connected to one another, the electrostatic force generating means simultaneously generates electrostatic force between each of the plurality of fixed electrodes and a corresponding one of the plurality of movable electrodes to simultaneously shield the light passing portions of the plurality of optical shutter units which are adjacent to one another in each of the plurality of optical shutter sets, and the electrostatic force generating means selectively generates electrostatic force to the plurality of shutter sets to selectively close the plurality of shutter sets.

In the display device according to the second aspect of this invention, the plurality of optical shutter sets construct a plurality of optical shutter groups each constructed by an arbitrary number of optical shutter sets which are arranged adjacent to one another and the plurality of shutter sets are selectively closed by the electrostatic force generating means in each of the plurality of optical shutter groups.

An amount of light passing through each of the shutter groups can be controlled according to the number of closed shutter sets among the plurality of shutter sets in each of the plurality of shutter groups.

Further, sizes of the plurality of shutter sets contained in each of the plurality of shutter groups are made different and an amount of light passing through each of the shutter groups can be controlled by selectively closing the plurality of shutter sets.

It is preferable to set a ratio of each of amounts of light passing through the plurality of shutter sets contained in each of the plurality of shutter groups other than the minimum amount to the minimum amount to an integral power of 2.

The plurality of shutter groups can constitute a plurality of pixels which can display dither gray scaling.

In the display device according to the second aspect of this invention, the opening/closing time can be reduced by simultaneously opening/closing the pixels (or sub-pixels) constructed by a plurality of shutter units.

Further, if eight sub-pixels are provided in each pixel and the ratio of the areas thereof is set to 1:2:4:8:16:32:64:128, for example, 256 gray scales can be attained by adequately combining the sub-pixels. Even a sub-pixel having a large area is constructed by a plurality of shutter units and the displacement amount of the movable electrode for one shutter unit can be set to 100 $\mu$m or less. As a result, the write-in time of 60 $\mu$sec can be attained and a moving picture can be treated.

A display device according to a third aspect of this invention comprises a light shielding movable film electrode of cantilever form having one end fixed; a first and a second fixed electrode arranged to face the movable electrode and having the movable electrode insulatively held therebetween, the first fixed electrode having a portion separated apart from the movable electrode to form a light path; a first insulating member disposed between the movable electrode and the first fixed electrode; a second insulating member disposed between the movable electrode and the second fixed electrode; a first voltage source for applying a desired voltage to the first fixed electrode; a second voltage source for applying a desired voltage to the second fixed electrode; and a third voltage source for applying a desired voltage to the movable electrode, wherein the movable electrode is attracted towards the first fixed electrode by an electrostatic force to shield a light, when a potential difference is applied between the movable electrode and the first fixed electrode, the movable electrode is attracted towards the second fixed electrode by the electrostatic force to pass the light, when a potential difference is applied between the movable electrode and the second fixed electrode, the third voltage source supplies a voltage obtained by adding a preset marginal voltage V2 to V1 to the movable electrode, when a potential which permits the movable electrode to first reach the first fixed electrode via the first insulating member is set to V1 in a case where the potential between the first fixed electrode and the movable electrode is gradually raised, the first voltage source supplies one of a voltage obtained by adding V1 to V2 and a ground voltage to the first fixed electrode, the second voltage source supplies the other one of the voltage obtained by adding V1 to V2 and the ground voltage to the second fixed electrode, and the movable electrode is attracted towards one of the first and the second fixed electrode according to a larger one of the potential differences with respect to the first and the second fixed electrode based on a difference between the electrostatic forces to open/close the light path.

It is preferable that the second fixed electrode has a symmetrical structure with the first fixed electrode with respect to the movable electrode and a potential which permits the movable electrode to first reach the second fixed electrode via the second insulating member is substantially equal to V1 in the first fixed electrode in a case where the potential difference between the second fixed electrode and the movable electrode is gradually raised.

In the display device of the third aspect, it is preferable that optical shutters each including the movable electrode, the first and the second fixed electrode are arranged in rows and columns, and there are provided a plurality of signal lines arranged for the respective columns, each of the plurality of signal lines being connected to the movable electrode of each of corresponding ones of the plurality of optical shutters, a plurality of first scanning lines arranged for the respective rows, each of the plurality of first scanning lines being connected to the first fixed electrode of each of corresponding ones of the plurality of optical shutters, and a plurality of second scanning lines arranged for the respective rows, each of the plurality of second scanning lines being connected to the second fixed electrodes of corresponding ones of the plurality of optical shutters.

When a potential at which the movable film electrode is first separated apart from one of the first and the second fixed electrode in a case where the potential difference between the movable electrode and the former one of the first and the second fixed electrode is gradually lowered from V1 is set to V3 and a potential which is higher than V3 and lower than V1 is set to V4, then a state in which the movable electrode is attracted to the former one of the first and the second fixed electrode is maintained by setting a potential of the first and the second fixed electrode to V4.

The plurality of first scanning lines are divided into groups each including k (k is an integer equal to or larger than 2) scanning lines, the first scanning lines of k contained in an arbitrary one of the plurality of groups can be electrically connected to first reference potential lines of k via first changeover switches each having a switching function of connecting the first scanning line to a ground line, and the plurality of second scanning lines are divided into groups each including k scanning lines in correspondence to the plurality of first scanning lines and the second scanning lines of k contained in an arbitrary one of the groups can be electrically connected to second reference potential lines of k via second changeover switches each having a switching function of connecting the second scanning line to the ground line.

The first scanning lines of k contained in the arbitrary one of the plurality of groups are respectively connected to the first reference potential lines of k having an arbitrary potential higher than the ground potential and lower than V1 via the changeover switches, the second scanning lines of k corresponding to the first scanning lines of k are respectively connected to the second reference potential lines of k having a potential of (V1+V2), and the light can be selectively shielded in the plurality of optical shutters contained in the arbitrary one of the plurality of groups according to time during which signal lines selected among the plurality of signal lines are kept at the potential of (V1+V2).

The second scanning lines of k contained in the arbitrary one of the plurality of groups are respectively connected to the second reference potential lines of k having an arbitrary potential higher than a ground potential and lower than V1 via the changeover switches, the first scanning lines of k corresponding to the second scanning lines of k are respectively connected to the first reference potential lines of k having a potential of (V1+V2), and the light can be selectively passed in the plurality of optical shutters contained in the arbitrary one of the plurality of groups according to time during which signal lines selected among the plurality of signal lines are kept at the potential of (V1+V2).

When a product of a potential difference between the movable electrode and the second fixed electrode by time during which arbitrary signal lines selected from the plurality of signal lines are kept at a potential of (V1+V2) reaches a preset value or more in the plurality of optical shutters contained in the arbitrary one of the plurality of groups, the movable electrode is attracted to the first fixed electrode and the light is shielded.

An amount of the light passing through the plurality of optical shutters contained in the arbitrary one of the plurality of groups is changed according to time during which arbitrary signal lines selected from the plurality of signal lines are kept at a potential of (V1+V2).

Only those of the plurality of optical shutters connected to arbitrary signal lines selected from the plurality of signal lines in which the potential difference between the movable electrode and the first fixed electrode is larger than a preset potential difference in the plurality of optical shutters contained in the arbitrary one of the plurality of groups can be set into a light passing state.

According to the third aspect of this invention, since the preset potential is applied to the signal lines even in the holding state, a movable film type display device in which the voltage amplitude of the signal line can be suppressed to minimum and the power consumption is small can be attained.

Further, one pixel is constructed by a plurality of scanning lines and a plurality of signal lines, the potentials of the plurality of scanning lines constructing one pixel are different from one another, and written sub-pixels (scanning lines) and non-written sub-pixels (scanning lines) are provided according to time required for the potential of one signal line simultaneously applied to the plurality of scanning lines to be used as the write-in potential. The written sub-pixels and non-written sub-pixels can be two-dimensionally selected by changing the write-in time for the plurality of signal lines constructing one pixel and, as a result, the gray scale display based on dither gray scaling can be attained.

Since the size of the shutter unit constructing one pixel (sub-pixel) is approximately 50 $\mu$m×50 $\mu$m, the high-definition image display can be attained by switching the driving system of the scanning lines over to the line-at-a-time scanning system.

As a result, a movable film type display device which can attain both of the high-definition image quality required in the display device and the display of moving picture of gray scale can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram for illustrating the features of conventional display devices;

FIGS. 2A and 2B are a perspective view and an upper cross sectional view showing the structure of one pixel of a movable film type display device according to a first embodiment of this invention;

FIGS. 3A to 3C are diagrams showing the principle of the movable film type display device;

FIGS. 10A to 10D are timing charts for illustrating the driving method for the circuit of FIG. 9;

FIGS. 10E and 10F are views showing the operation states of a movable shutter in the respective timings (holding state, selecting state) of FIG. 10A;

FIG. 12A is a schematic cross sectional view for illustrating the structure and operation of the movable film type display device of the first embodiment;

FIG. 12B is a schematic plan view for illustrating the structure and operation of the movable film type display device of the first embodiment;

FIG. 34 is a diagram showing the relation between the potentials of the signal line and scanning line and the states of the pixel in the fifth embodiment;

FIG. 37 is a diagram showing the relation between the potentials of the signal line and scanning line and the states of the pixel in the sixth embodiment;

DETAILED DESCRIPTION OF THE INVENTION

Figure 4:
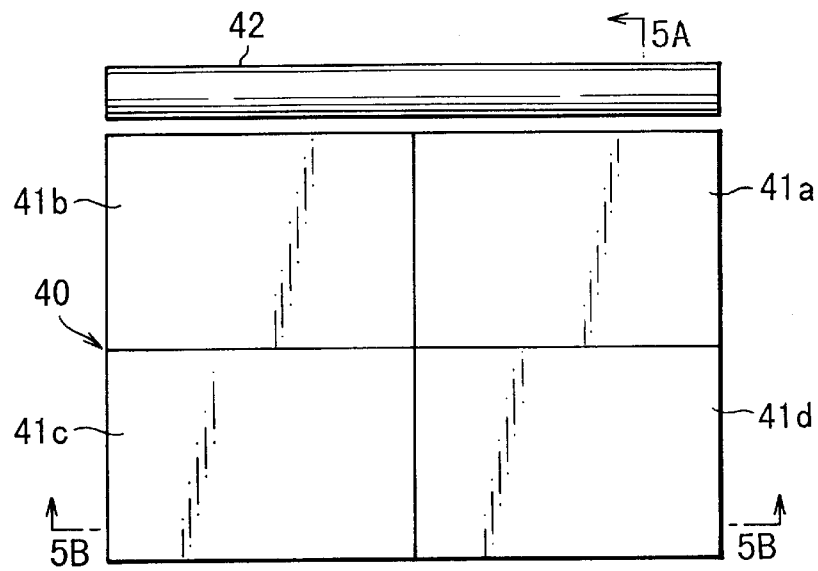
FIG. 4 is a schematic plan view showing the movable film type display device according to the first embodiment.

There will now be described embodiments of this invention with reference to the accompanying drawings.

[First Embodiment]

First, the structure of a pixel which is the feature of a movable film type display device of this embodiment is explained.

FIGS. 2A and 2B are views showing the structure of one pixel of the movable film type display device according to a first embodiment of this invention.

First, the whole structure of one pixel is explained with reference to the perspective view of FIG. 2A. Reflector plates 21 (21a, 21b) formed of, for example, satin-finished aluminum plates or silver plates or white plates with high reflectance are formed on two surfaces of a transparent light guiding fixed electrode portion 10 which face the curved surface thereof. Further, a movable film electrode (conductive light shielding plate) 22 having light shielding, elastic and conductive properties is disposed in opposition to the curved surface of the transparent light guiding fixed electrode portion 10. The movable film electrode 22 is formed of a material such as a metal foil of nickel or aluminum or PET (poly-ethyleneterephthalate) having a conductive material such as aluminum or silver vapor-deposited thereon.

As shown in the upper cross sectional view of FIG. 2B, the transparent light guiding fixed electrode portion 10 is constructed by a transparent light guiding member 11 formed of acrylic resin or polycarbonate, a transparent conductive layer 12 formed of ITO (Indium Tin Oxide) on the curved surface of the transparent light guiding member 11, a transparent insulating film 13 formed on the transparent conductive layer 12 to prevent the short circuit with the movable film electrode, and a black matrix 14 formed on the transparent insulating film 13 to define one pixel. The black matrix 14 is formed by coating light-shielding ink, for example. The transparent conductive layer 12 has an opening 15 which is not covered with the black matrix 14.

Light incident on the side surface of the transparent light guiding member 11 is emitted from the opening 15 via the transparent light guiding member 11, transparent conductive layer 12 and transparent insulating layer 13. In the movable film type display device of this embodiment, the display of gray scale is attained by bending the movable film electrode 22 and changing the area of the opening 15 which is covered with the movable film electrode 22 so as to change the amount of light emitted from the opening 15.

The principle of displacing the movable film electrode 22 is explained with reference to FIGS. 3A to 3C. As shown in the circuit diagram of FIG. 3A, the circuit includes a capacitor formed of two electrode plates 31, 32, switch 33 and battery 34.

When the switch 33 is turned ON and a voltage of the battery 34 is applied between the two electrodes 31 and 32, electrostatic force is applied between the electrodes and the two electrodes 31 and 32 attract each other.

As shown in FIG. 3B, the actual construction of this embodiment includes a curved fixed electrode (transparent conductive electrode) 35 and a movable electrode (movable film electrode) 36 formed of an elastic body. In this case, an insulating film (not shown) is disposed between the electrodes without fail. When the switch 33 is turned ON to apply a voltage between the two electrodes 35 and 36, electrostatic force is applied between the electrodes 35 and 36. Then, the movable electrode 36 which is formed of an elastic body can be bent towards the fixed electrode 35. The bending amount of the movable electrode 36 can be controlled by the electrostatic force, that is, the potential difference between the electrodes. If the switch 33 is turned OFF to eliminate the potential difference between the two electrodes 35 and 36, the movable electrode 36 returns to the original position by its own elastic stress.

Thus, in the above display device, the bending amount of the movable film electrode 22 is changed by controlling the potential difference between the transparent conductive layer 12 and the movable film electrode 22 and the area of the opening 15 which is covered with the movable film electrode 22 is controlled.

Further, as shown in FIG. 3C, it is also possible to provide curved fixed electrodes 35 and 37 on both sides of the movable electrode 36. Since an electrostatic force can be applied from any side by adequately selecting switches 33a and 33b to change the direction of the electric field, an electrode having no or small elastic modulus can be used.

Figure 5A:
FIG. 5A is a cross sectional view taken along the line 5A—5A of FIG. 4.
Figure 5B:
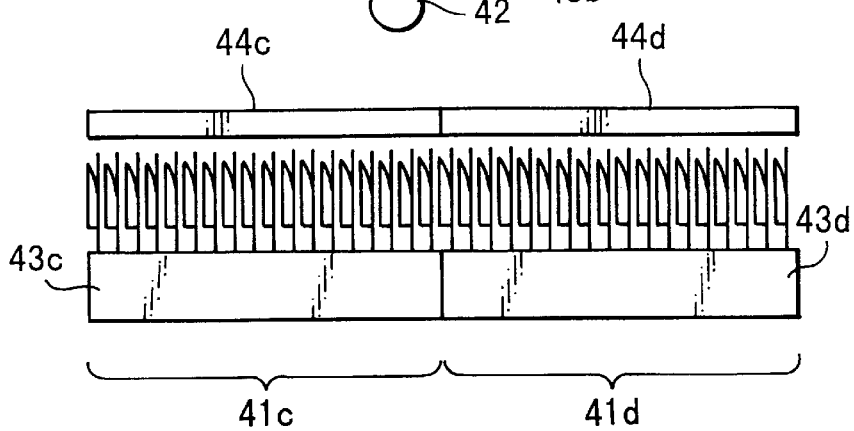
FIG. 5B is a cross sectional view taken along the line 5B—5B of FIG. 4.

Next, the whole construction of the movable film type display device is explained with reference to FIGS. 4, 5A and 5B. FIG. 4 is a plan view showing the construction of the movable film type display device according to the first embodiment of this invention. FIGS. 5A and 5B are cross sectional views showing the construction of the movable film type display device of FIG. 4. FIG. 5A is a cross sectional view taken along the line 5A—5A of FIG. 4 and FIG. 5B is a cross sectional view taken along the line 5B—5B of FIG. 4.

A display section 40 of the display device is constructed by display units 41 (41a to 41d) in which pixels shown in FIG. 2A are arranged in a matrix form. Fluorescent lamps 42 are disposed in positions opposite to the side surfaces of the display section 40. The display units 41 are connected to driving circuits 43 (43a to 43d). Color filters 44 (44a to 44d) are disposed in front of the display units 41 (41a to 41d).

The number of pixels of the display unit 41 is approximately 100×100 and the size thereof is approximately 10 cm (4 in.)×10 cm (4 in.).

The sizes of various portions set when a large display device of 40 inches or more is manufactured are explained below. The size of a pixel (corresponding to three pixels shown in FIG. 2A) used for color display becomes relatively large and is approximately 1 mm square. Therefore, the width W in the vertical direction of one pixel is approximately 1 mm and the width D in the lateral direction thereof is approximately 0.33 mm since three pixels for three primary colors RGB are arranged. The length L thereof is 1 to 4 mm and the thickness of the movable film electrode 22 is 3 to 12 $\mu$m. The length and thickness of the movable film electrode 22 are set in the trade-off relation, and if the electrostatic force applied is constant, the length is required to be made larger as the thickness becomes larger.

Next, the display method of the display device is briefly explained. Light emitted from the fluorescent lamp 42 passes through the transparent light guiding fixed electrode portion 10, the amount of transmission light is controlled by the movable film electrode 22, and the transmitted light is colored when passing through the color filter 44. The movements of the movable film electrodes 22 are controlled by the driving circuits 43a to 43d.

Pixels having the same construction as that shown in FIG. 2 are arranged in rows and columns in the display unit 41. The construction of the pixel unit is explained with reference to the perspective view of FIG. 6.

Figure 6:
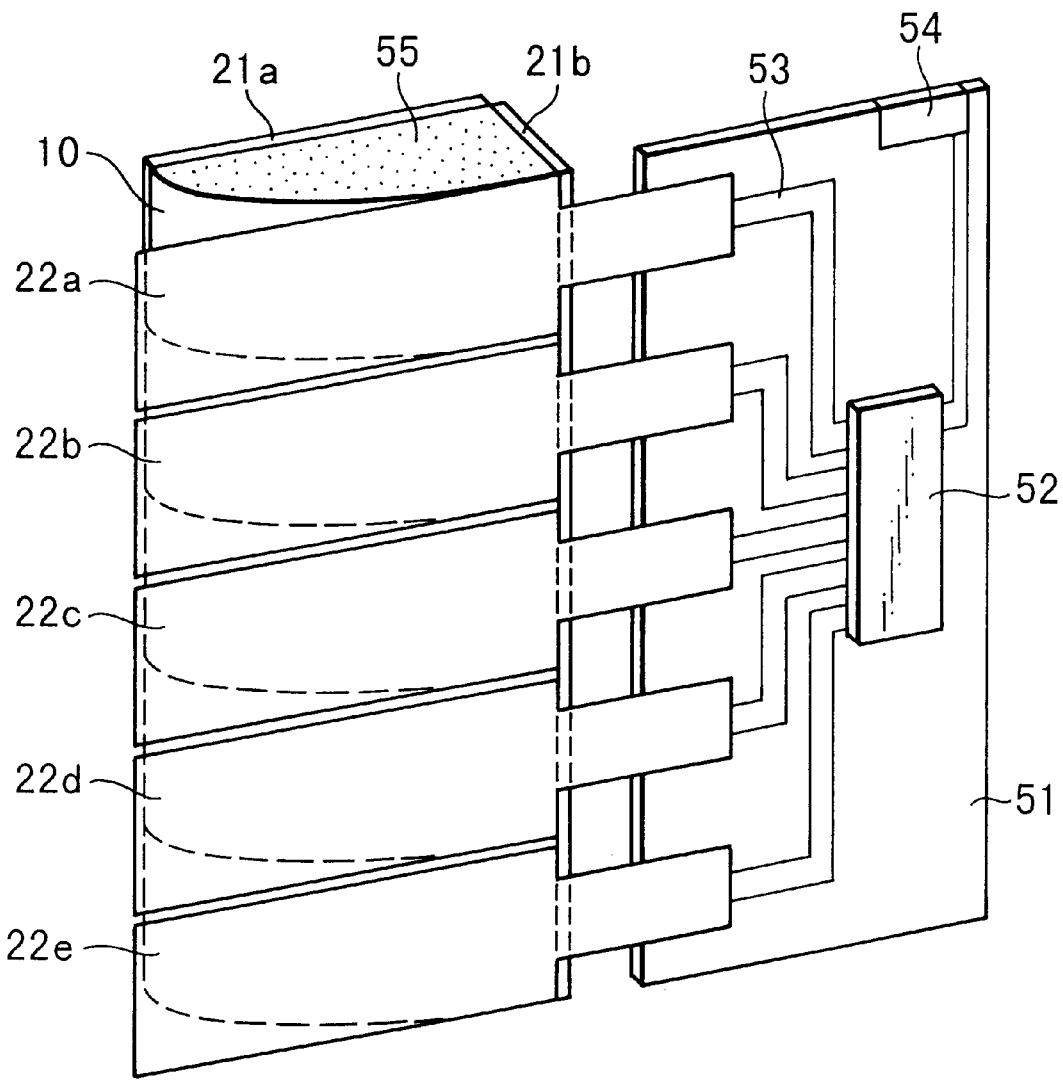
FIG. 6 is a perspective view showing the structure of a pixel unit of the movable film type display device of the first embodiment.

A large number of pixel units having the same construction as that shown in FIG. 2A are arranged such that the movable electrodes 22 will be set on the same plane. The construction can be made such that a plurality of movable film electrodes 22a to 22e will be arranged in opposition to one transparent light guiding fixed electrode portion 10. FIG. 6 shows the construction thus obtained.

A circuit board 51 is provided adjacent to the transparent light guiding fixed electrode portion 10 and a driving IC 52 is formed on the circuit board 51. The movable film electrodes 22a to 22e are connected to the driving IC 52 via wirings 53. Further, a connector 54 is formed on the circuit board 51 to permit information transfer with respect to the adjacent display unit.

A transparent conductive body 55 having elasticity and electrically connected to the transparent conductive layer is formed on the side surface of the transparent light guiding fixed electrode portion 10. When the display unit is constructed, the transparent conductive layer of the adjacent display unit is electrically connected via the conductive body 55. The transparent conductive body 55 is formed by coating a transparent conductive layer of ITO or the like on the surface of a transparent material having elasticity such as silicone rubber. By forming the transparent conductive body 55 of an elastic material and pressing the transparent light guiding fixed electrode portion 10 from both sides, a poor contact can be prevented.

Figure 7:
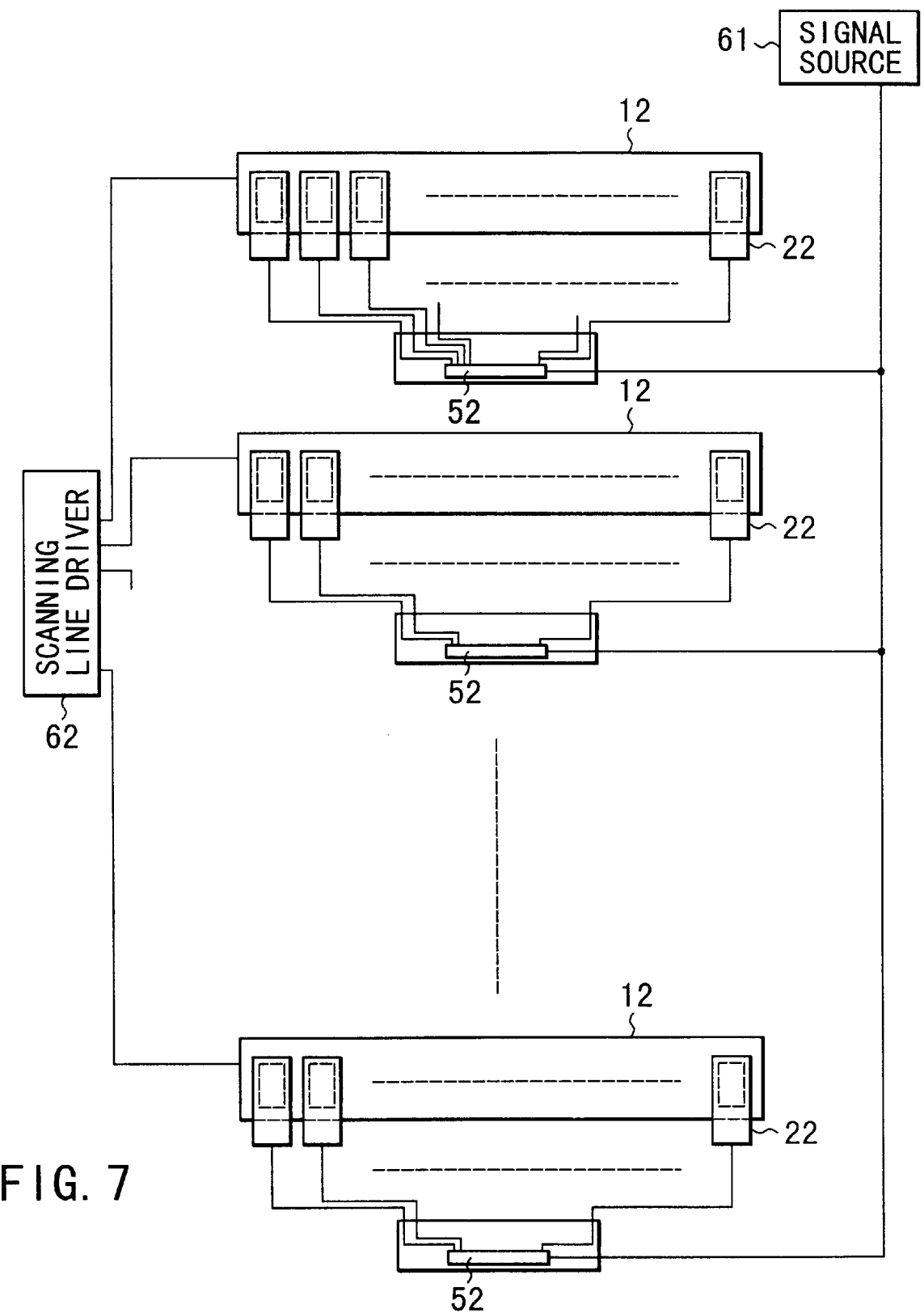
FIG. 7 is a connection diagram showing a circuit construction of the movable film type display device of the first embodiment.

Next, the driving method of the display device is explained. FIG. 7 is a circuit diagram of the display device. In the display device, the transparent conductive layer 12 of the transparent light guiding fixed electrode portion plays a role of the scanning line. Video information transmitted from a signal source 61 is temporarily stored in the driving IC 52 and then transmitted as a potential to the movable film electrode 22. If a potential is adequately applied from the driving IC 52 to the transparent conductive layer 12, a potential difference occurs with respect to the movable film electrode 22 and the movable film electrode 22 can be bent towards the transparent conductive layer 12. If the potentials of the movable film electrode 22 and the transparent conductive layer 12 are set equal to each other, no attraction force is applied between the movable film electrode 22 and the transparent conductive layer 12 and the movable film electrode 22 is separated apart from the transparent light guiding member electrode 11 by its own elasticity.

In the case of the above circuit, the driving IC 52 and the movable film electrodes 22 for each pixel are directly connected to each other and electrostatic force applied between the transparent conductive layer 12 and the movable film electrode 22 is controlled by applying a potential corresponding to information stored in a memory (latch circuit) of the driving IC 52 from the signal source 61 to each movable film electrode 22 to control the area of the opening of the transparent light guiding fixed electrode portion which is covered with the movable film electrode 22.

The potential of the transparent conductive layer 12 is controlled by a scanning line driving IC 62 and it is sequentially applied with a potential by use of a shift register.

Further, it is also possible to simultaneously apply potentials corresponding to a signal to the movable film electrodes for display while a constant potential is kept applied to all of the transparent conductive layers (scanning lines) 12.

A voltage applied to the movable film electrode is 10 to 200V and the power consumption is low. As the driving IC 52, a simple matrix driver IC, plasma display IC or the like can be used.

Figure 8:
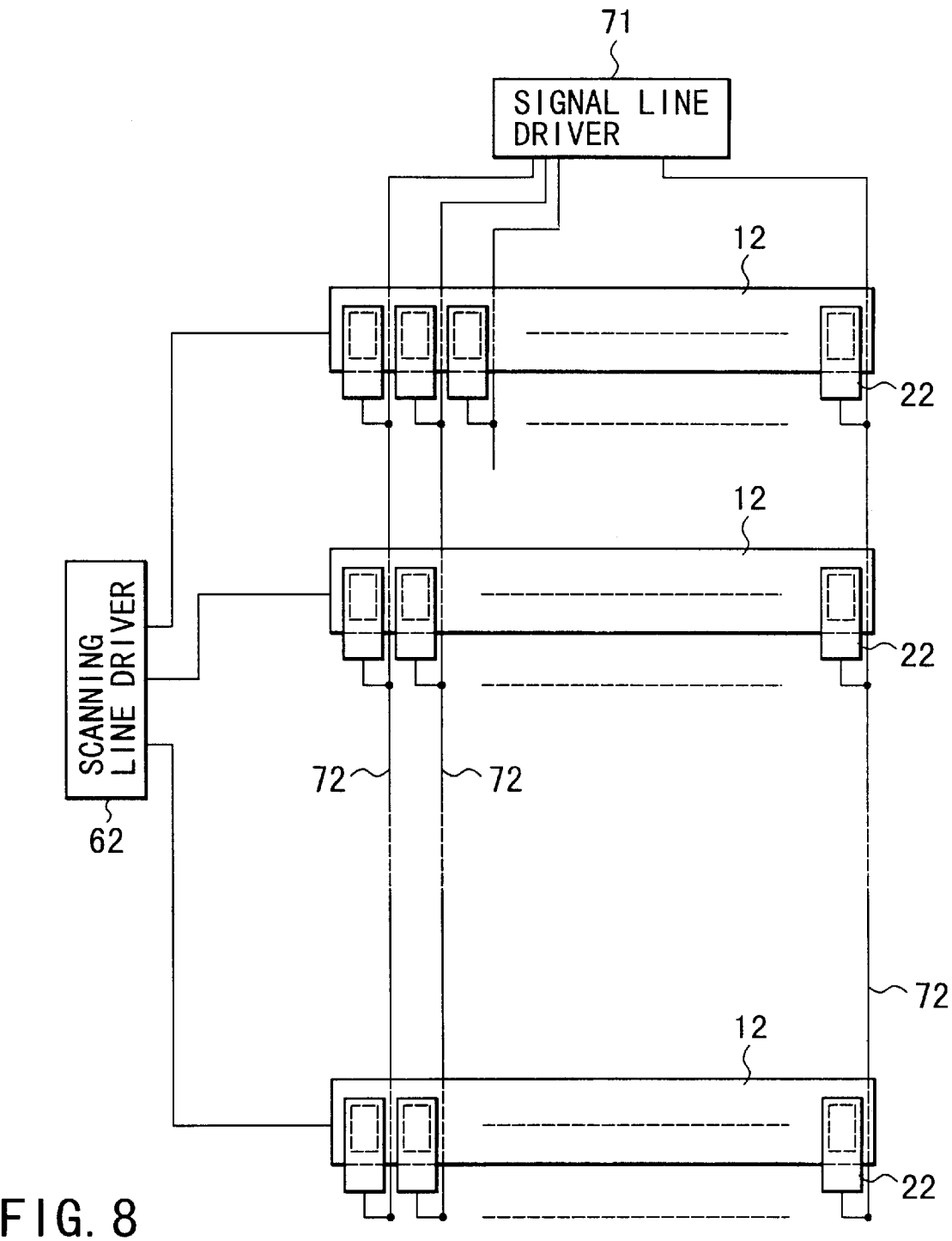
FIG. 8 is a connection diagram showing another circuit construction of the movable film type display device of the first embodiment.

However, in the case of the above circuit described above, it is necessary to provide a driving IC 52 for each scanning line, the number of driving ICs is increased and the cost becomes high. In order to lower the cost, as shown in FIG. 8, a signal driving IC 71 and signal lines 72 are provided to continuously supply video information to all of the signal lines, and video information can be selectively used by adequately applying potentials to the transparent conductive layers (scanning lines) 12 by use of the scanning driving IC 62.

Figure 9:
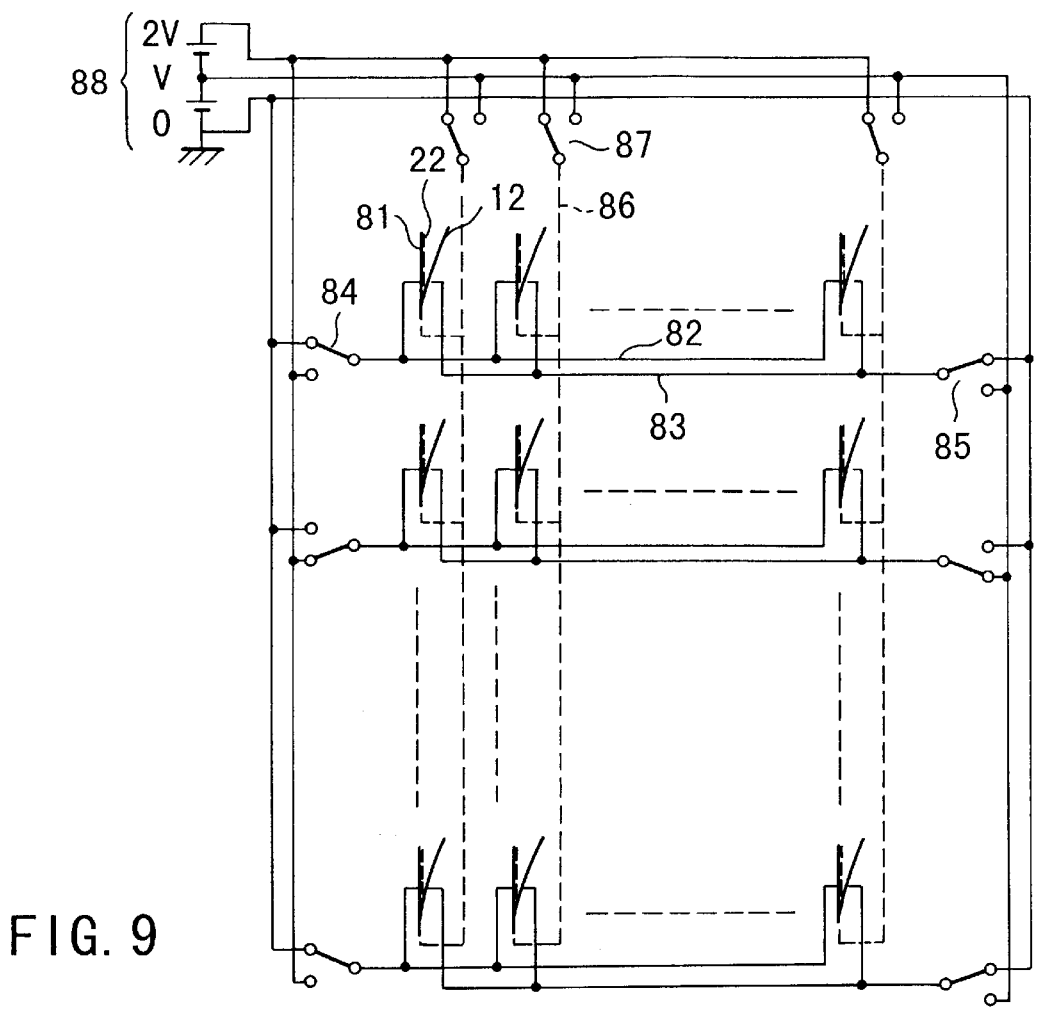
FIG. 9 is a connection diagram showing still another circuit construction of the movable film type display device of the first embodiment.

Further, the fixed electrode may include a fixed electrode 81 corresponding to the fixed electrode 37 of FIG. 3C as shown in the circuit diagram of FIG. 9 in addition to the transparent conductive layer 12. The movable film electrodes 22 are connected to signal lines 86 arranged in the column direction and the transparent conductive layers 12 and fixed electrodes 81 are respectively connected to signal lines 83 and 82 arranged in the row direction. The end portion of the signal line 86 is connected to a power supply 88 via a potential changeover switch 87. The end portions of the scanning lines 82, 83 are connected to the power supply 88 via potential changeover switches 84, 85, respectively. The potentials of the wirings and electrodes can be selectively set to one of potentials of 0, v and 2v.

The driving method is explained with reference to FIGS. 10A to 10E.

FIG. 10A shows a time base, H on the time base indicates a holding state and S indicates a selecting state.

FIGS. 10B to 10D are timing charts of potentials of the respective electrodes, FIG. 10B (A) shows the potential of the fixed electrode 81, FIG. 10C (B) shows the potential of the transparent conductive layer 12 and FIG. 10D (C) shows the potential of the movable film electrode 22.

FIGS. 10E and 10F are views indicating the positions of the movable film electrodes. FIG. 10E indicates the positions of the movable film electrodes 22 in the holding state (H) and FIG. 10F indicates the positions of the movable film electrodes 22 in the selecting state (S).

The holding state is a state in which the potentials of the transparent conductive layer 12 and the fixed electrode 81 are equal to each other and the movable electrode 22 is attracted towards a closer one of the electrodes irrespective of the potential. The selecting state is a state in which the potentials of the transparent conductive layer 12 and the fixed electrode 81 are different from each other and one of the electrodes which the movable electrode 22 approaches is determined according to the potentials thereof.

The potential states of the pixels are repeatedly set into the holding state and selecting state. The fixed electrode 81 is set to a potential of 0 in the holding state and is set to a potential of 2v in the selecting state. The transparent conductive layer 12 is set to a potential of 0 in the holding state and is set to a potential of v in the selecting state. The potential of the movable film electrode 22 can be set to any potential in the holding state and if it is set to a potential of 2v in the selecting state, the movable film electrode 22 moves towards the fixed electrode 81, and if it is set to a potential of v, the movable film electrode moves towards the transparent conductive layer 12. Thus, desired image information can be written into the pixels.

If two fixed electrodes are provided, as described above, the movable film electrode may not have elasticity and the surface thereof on which the transparent conductive layer is formed or the surface from which light is emitted may be formed flat.

Figure 11:
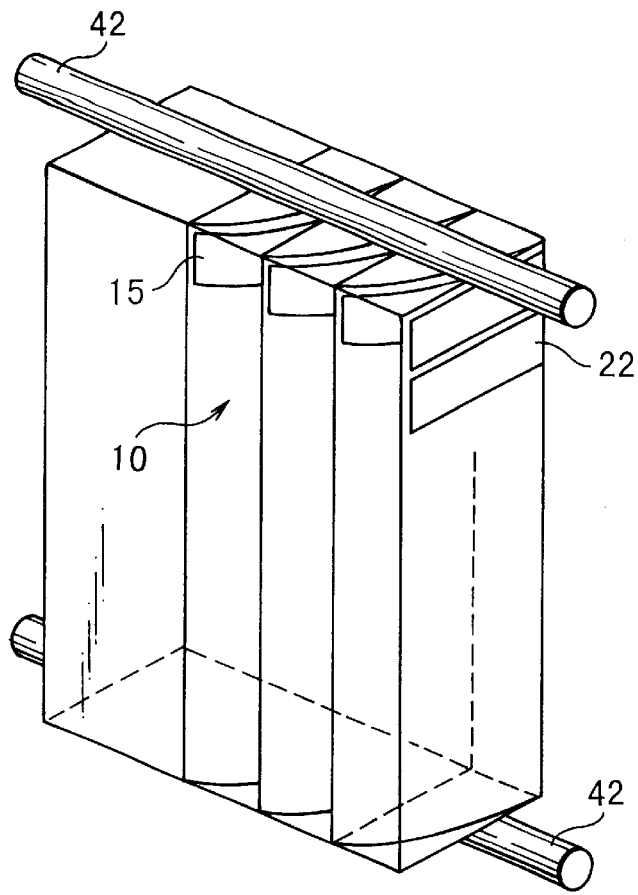
FIG. 11 is a perspective view showing the whole structure of the movable film type display device of the first embodiment.

The display operation of the display device is further explained with reference to FIGS. 11, 12A and 12B. FIG. 11 is a perspective view showing the structure of the movable film type display device. FIGS. 12A and 12B are a plan view and cross sectional view showing the structure of the movable film type display device, respectively.

Light from the fluorescent lamp 42 is incident on the transparent light guiding fixed electrode portion 10, reflected from the reflection plate 21 and emitted in the forward direction of the display device via the opening 15, and colored by the color filters and output. In this case, if the movable film shutter 22 covers the opening 15, no light is output. In FIGS. 11, 12A and 12B, a combination body of display units is not shown but, of course, it is possible to form a large display device by use of a combination body of a plurality of display units as shown in FIGS. 4, 5A and 5B.

Further, as is clearly seen from FIG. 12, the circuit board 51 is mounted on the rear side of the reflection plate 21b and the space utilization efficiency can be enhanced.

According to this embodiment, since the transparent conductive layer can be formed by injection molding and the movable film electrode can utilize a capacitor PET film, the display unit can be formed at a low cost. Therefore, the whole display device can be manufactured at a low cost.

The color filter of the display device is not necessarily precisely printed on a glass substrate as in the color filter of LCD or PDP because the pixel pitch is rough. Therefore, the color filter of the display device can be formed with a precision attained by a simple printing process and the display device can utilize an extremely inexpensive color filter.

Further, the boundary lines formed when the display units are combined will not substantially be visually recognized because the pixel pitch is rough.

[Second Embodiment]

Figure 13:
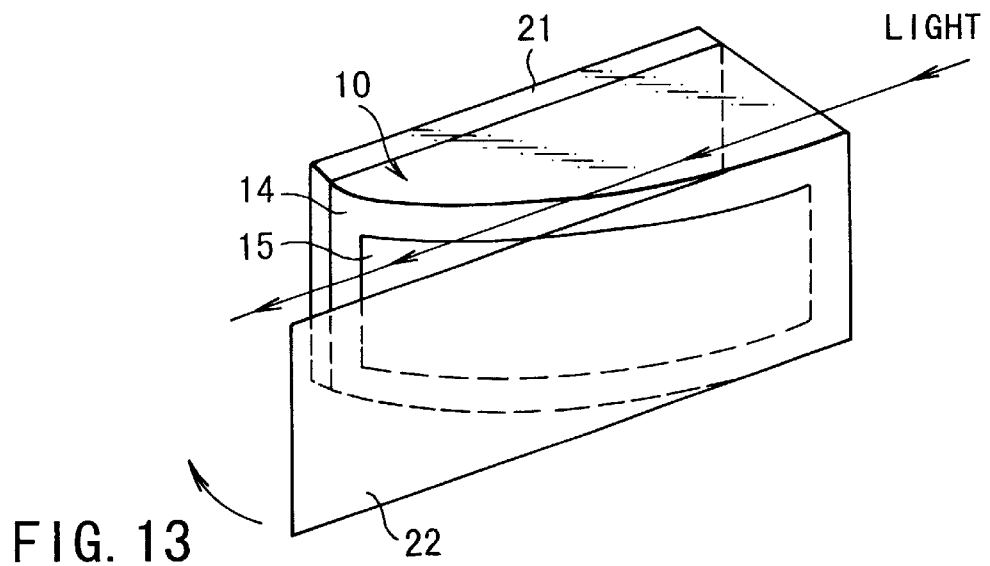
FIG. 13 is a perspective view showing the structure of one pixel of a movable film type display device according to a second embodiment of this invention.
Figure 14A:
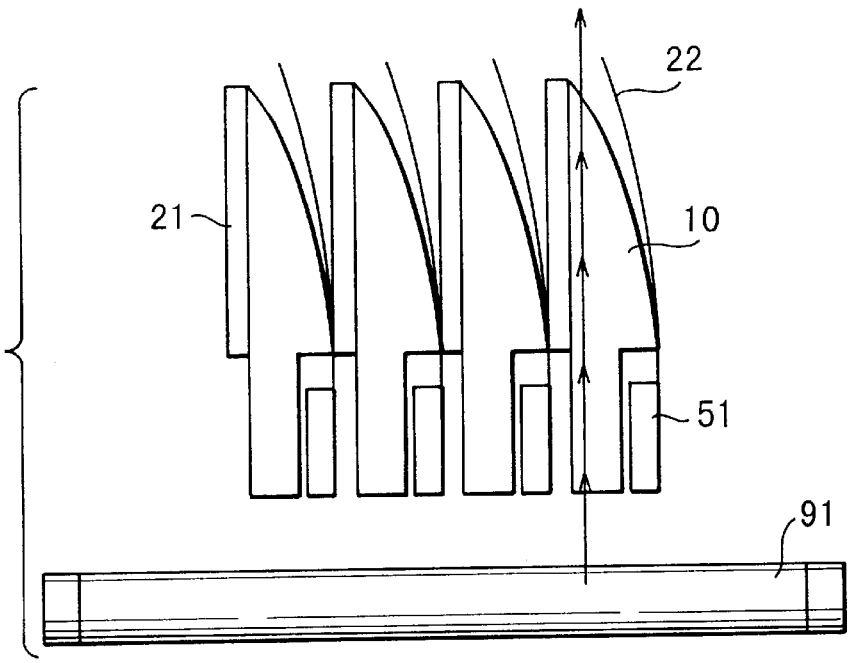
FIG. 14A is a schematic cross sectional view for illustrating the structure and operation of the movable film type display device of the second embodiment.
Figure 14B:
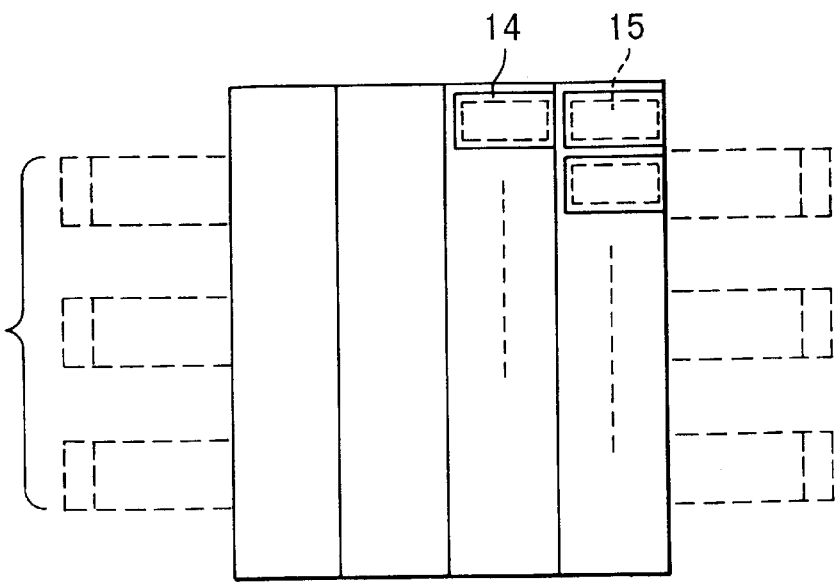
FIG. 14B is a schematic plan view for illustrating the structure and operation of the movable film type display device of the second embodiment.

FIG. 13 is a perspective view showing the structure of a pixel used in a movable film type display device according to a second embodiment of this invention. FIGS. 14A and 14B are views for illustrating the structure and display principle of the movable film type display device of the second embodiment. FIGS. 14A and 14B are a partial cross sectional view and plan view of the movable film type display device, respectively.

The feature of this embodiment is that the reflection plate 21b of the bottom surface of the transparent light guiding fixed electrode portion 10 of FIG. 2A is removed and light is made incident via a plane where the reflection late 21b was disposed. That is, as shown in FIGS. 14A and 14B, fluorescent lamps 91 are disposed on the bottom surface side of the transparent light guiding fixed electrode portion 10. In the structure of this embodiment, the number of fluorescent lamps 91 can be easily increased and a display device of high luminance can be attained.

Figure 15:
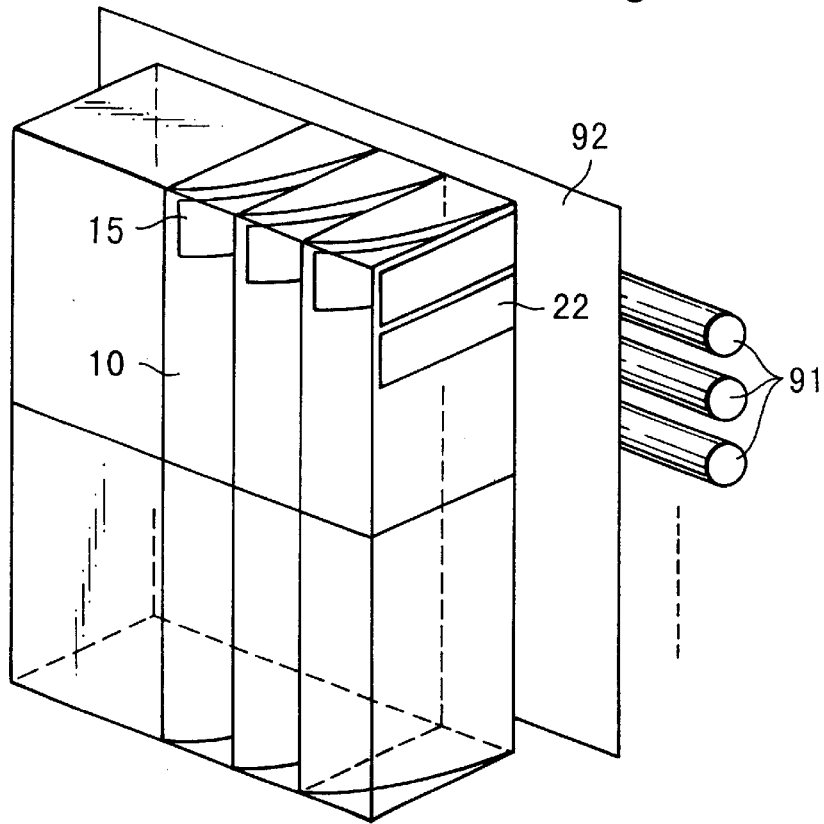
FIG. 15 is a perspective view showing the whole structure of the movable film type display device of the second embodiment.

Further, as shown in the perspective view of FIG. 15, a diffusion plate 92 may be provided between the fluorescent lamps 91 and the display section. The driving method and driving circuit may be the same as those explained in the first embodiment.

This invention is not limited to the above embodiments. For example, the surface on which the transparent conductive layer of the transparent light guiding fixed electrode portion 10 is formed is not necessarily curved.

Further, in this embodiment, the insulating film is formed on the transparent conductive layer, but an insulating film for preventing the short circuit may be formed on at least one of the surface of the transparent conductive layer and the surface of the movable film electrode. However, since the weight of the movable film electrode is increased if the insulating film is formed on the surface of the movable film electrode, it becomes necessary to apply a stronger electric field so as to move the movable film electrode. Therefore, it is preferable to form a transparent insulating film only on the surface of the transparent conductive layer.

[Third Embodiment]

Next, an embodiment of an optical shutter for shortening the open/close time by simultaneously opening/closing a plurality of movable film electrodes is explained.

Figure 16:
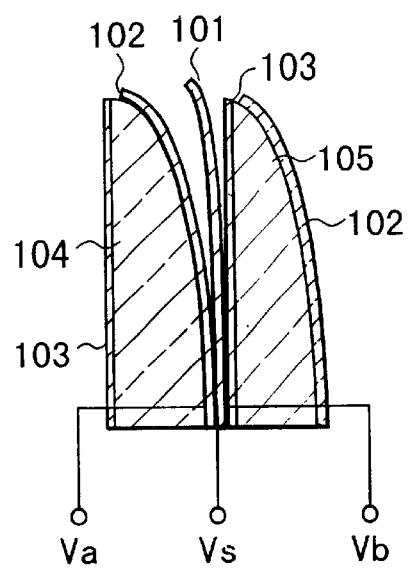
FIG. 16 is a cross sectional view of a shutter unit of a display device according to a third embodiment of this invention.
Figure 17:
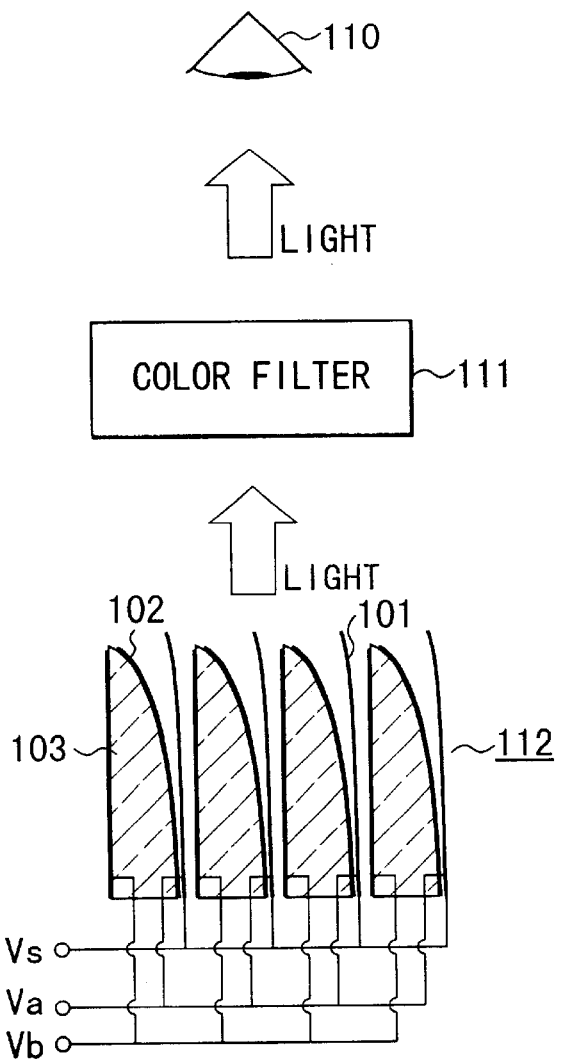
FIG. 17 is a schematic view for illustrating the display principle of the display device of the third embodiment.

FIGS. 16 and 17 are the conceptual views of a third embodiment of this invention. FIG. 16 is a cross sectional view of basic elements (shutter units) of a shutter and FIG. 17 is a view for illustrating the principle of simultaneously operating a plurality of shutter units.

In FIG. 16, 101 indicates a cantilever type movable film electrode and both surfaces or one surface thereof is coated with a conductive material. The movable film electrode 101 has a property of shielding light.

A light guiding member 104 having a transparent fixed electrode 102 formed on the surface thereof in opposition to one surface of the movable film electrode 101 is disposed and a light guiding member 105 having a light shielding fixed electrode 103 formed on the surface thereof in opposition to the other surface of the movable film electrode 101 is disposed. The light guiding members 104 and 105 have the same structure and one surface of the light guiding member which is curved is covered with the transparent fixed electrode 102 and the other surface thereof which is vertical is covered with the light shielding fixed electrode 103.

The potential of the movable film electrode 101 can be controlled from the exterior and the potential is set to Vs. The potentials of the two fixed electrodes of transparent and light shielding properties can also be controlled from the exterior and the potentials are set to Va, Vb.

The movable film electrode 101 can be bent by the electrostatic field based on potential differences among Vs, Va and Vb and transmission or non-transmission of light which has passed through the light guiding member can be controlled.

That is, if a potential difference between Vs and Va is sufficiently large and Vb=Vs, the movable film electrode 101 is bent towards the transparent fixed electrode 102 to shield the transmission light. If a potential difference between Vs and Vb is sufficiently large and Va=Vs, the movable film electrode 101 is attracted towards the light shielding fixed electrode 103 and the shutter is set into the open state to permit light passing through the light guiding member to pass therethrough.

An insulating film is formed on the surface of the movable electrode of the movable film electrode 101 or the surfaces of the fixed electrodes 102 and 103 so as to prevent the movable electrode and the fixed electrode from being electrically short-circuited.

Next, the display principle is explained with reference to FIG. 17. Light emitted from a light source 113 passes through a shutter set 112 constructed by a plurality of shutter units and a color filter 111 and reaches the eye 110 of an observer. In this case, transmission or non-transmission of light is determined by the shutter set 112. The transparent fixed electrode 102 and the light shielding fixed electrode 103 of the shutter unit are indicated by thick solid lines for brevity of the drawing. This applies to the drawings appearing after this.

All of the transparent fixed electrodes 102 in the shutter set 112 are electrically connected together and the potential thereof is set to Va. Likewise, the light shielding fixed electrodes 103 of the shutter set 112 are electrically connected together and the potential thereof is set to Vb.

In FIG. 17, the shutter set 112 includes four shutter units and the four shutter units are simultaneously opened/closed.

Thus, the operation speed of the shutter can be enhanced by simultaneously opening/closing a plurality of shutter units. This is because the deflection amount of the cantilever of a small shutter is small in comparison with a large shutter and the electric field applied to the movable film shutter is stronger so that the high-speed response can be attained. Therefore, when a shutter for turning ON/OFF light is formed, the response speed can be made higher by forming the same by use of a plurality of shutters of small deflection amount rather than forming the same by use of one shutter of large deflection amount.

[Fourth Embodiment]

Next, an embodiment of a display device capable of displaying an image or the like of excellent gray scale by use of the shutter set of the third embodiment is explained.

Figure 18:
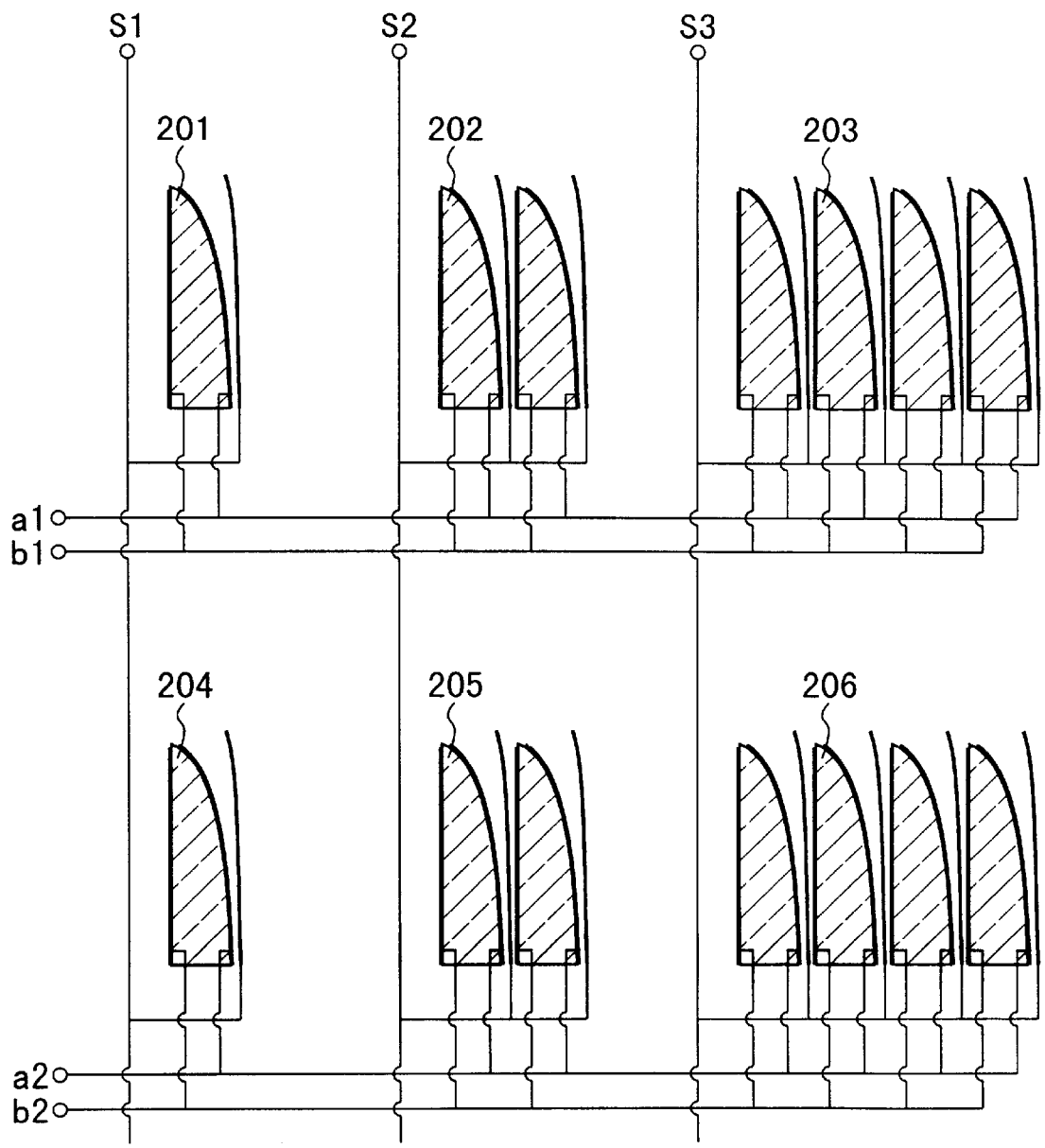
FIG. 18 is a connection diagram for illustrating the pixel structure of the display device of the third embodiment.

FIG. 18 is a connection diagram obtained when a plurality of shutter sets 112 of the third embodiment are combined. In the example of FIG. 18, shutter sets are arranged in a matrix form of 3×2 and six shutter sets construct one pixel. That is, one shutter set corresponds to a sub-pixel.

Further, the amounts of transmission light of the six sub-pixels are different from one another. The width of the shutter unit is set in the normal direction with respect to the drawing and cannot be shown in the drawing, but the widths (depths) of the shutter sets 201, 202, 203 are small and the widths (depths) of the shutters sets 204, 205, 206 are large.

The shutter sets 201, 204 have one shutter unit, the shutter sets 202, 205 have two shutter units, and the shutter sets 203, 206 have four shutter units. Thus, the amount of transmission light in each pixel is changed.

In this example, the pixel can display gray scale by use of a plurality of (in this example, six) sub-pixels. That is, the amount of transmission light is changed according to the light transmission areas by selectively turning ON/OFF the six sub-pixels so as to display gray scale. The principle is explained in detail below.

In FIG. 18, signal lines s1, s2, s3 are electrically connected to the movable electrodes of the corresponding sub-pixels. Further, a1, b1 are first-row scanning lines and a2, b2 are second-row scanning lines. Individual image information items can be written into the six sub-pixels by selectively setting the potentials of the signal lines and scanning lines.

If one pixel is constructed by eight sub-pixels and the ratio of the areas of the sub-pixels is set to 1:2:4:8:16:32:64:128, then 256 gray scales can be attained by adequately combining the sub-pixels driven. Generally, a television image can be displayed without causing any problem if 256 gray scales are provided.

Figure 19:
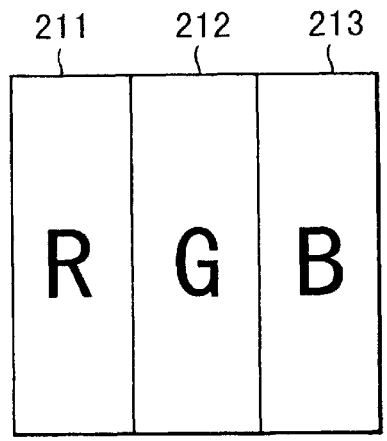
FIG. 19 is a view showing the array of color filters of a display device according to a fourth embodiment of this invention.

This is explained with reference FIGS. 19 to 21. In general, it is necessary to prepare 640×480 pixels in order to display a television image. FIG. 19 is a view of one pixel as viewed from the color filter side. In FIG. 19, 211, 212, 213 respectively indicate R (red), G (green), B (blue) of the color filter.

Figure 20:
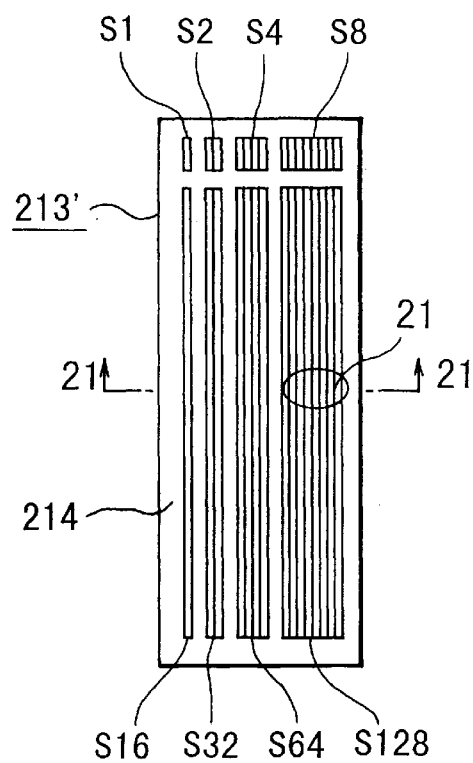
FIG. 20 is a plan view showing the structure of one pixel of the display device of the fourth embodiment.

FIG. 20 is a view of one of R, G, B, for example, B in which the color filter is removed. FIG. 20 corresponds to one pixel (213') described before. The size of one pixel is 1.5 mm×0.5 mm, for example. The pixel 213' includes eight types of sub-pixels having different sizes as described before and numerals attaches to a reference symbol S indicating the sub-pixel in FIG. 20 indicate the area ratios. That is, S1:S2:S4:S8:S16:S32:S64:S128=1:2 4:8:16:32:64:128. A frame 214 covering the peripheral potions of the sub-pixels is a light shielding black matrix for separating the sub-pixels from each other.

Figure 21:
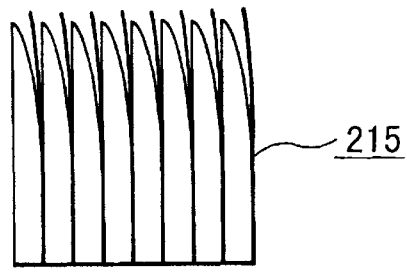
FIG. 21 is a cross sectional view taken along the line 21—21 of FIG. 20 and showing a portion indicated by a circle 21.

A sub-pixel which is the largest one of the eight sub-pixels is selected and the cross section thereof is shown in FIG. 21. In this embodiment, the optical system is constructed in the same manner as in the case of FIG. 17 in the third embodiment, and the shutter set 112 is replaced by a shutter set 215. Referring to FIG. 17, light emitted from the light source 113 is incident on the eyes 110 of an observer via the shutter set 215 and color filter 110 (213 in FIG. 19). In FIG. 21, the fixed electrode of the shutter set 215 is omitted for brevity of the drawing.

The shutter set 215 includes eight shutter units and the pixel 213' has 30 shutter units in total. With this construction, a television image having gray scale can be displayed.

Further, as a method for changing the amount of transmission light in the pixel, it is possible to change the amount of transmission light by changing the sizes of the openings of the black matrix 214 instead of changing the width of the shutter unit and the number of shutter units.

Figure 22:
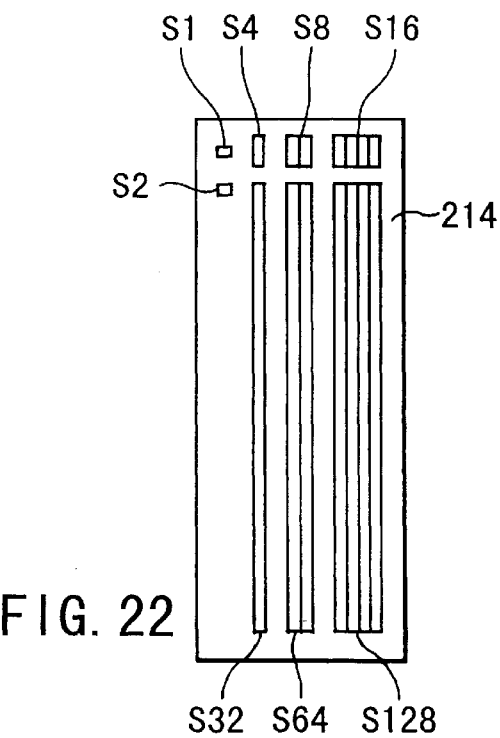
FIGS. 22 to 26 are plan views showing modifications of FIG. 20.

FIG. 22 shows an example in which the sizes of the openings are changed. The width of the shutter unit S1 is set to ¼ of the width of the shutter unit S1 of FIG. 20 and the sizes of all of the openings are reduced. That is, the sizes of the openings are adjusted by changing the widths of the shutter units. The advantage of this arrangement is that the number of shutter units can be reduced and, in this case, the number of shutter units for each pixel is 16. The disadvantage of this embodiment is that the aperture ratio becomes low.

Figure 23:
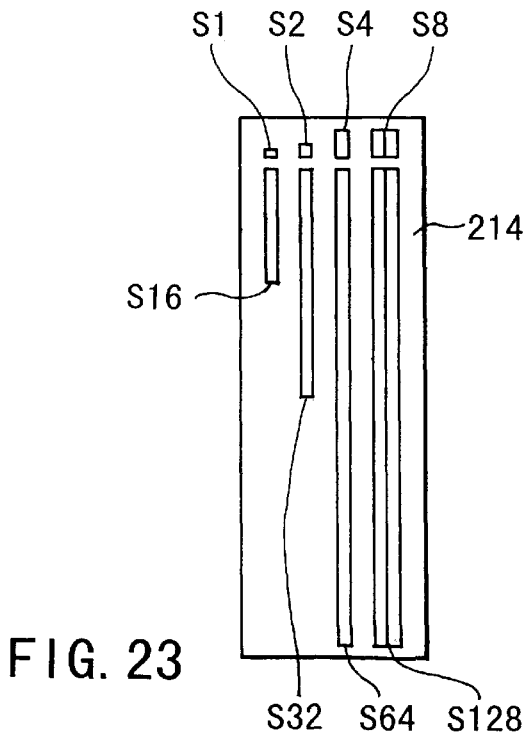
Figure 24:
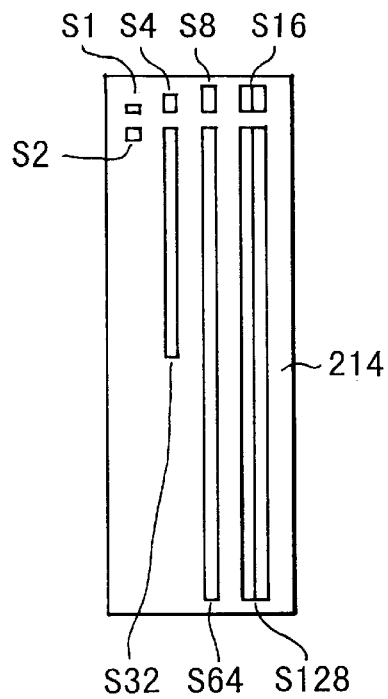
Figure 25:
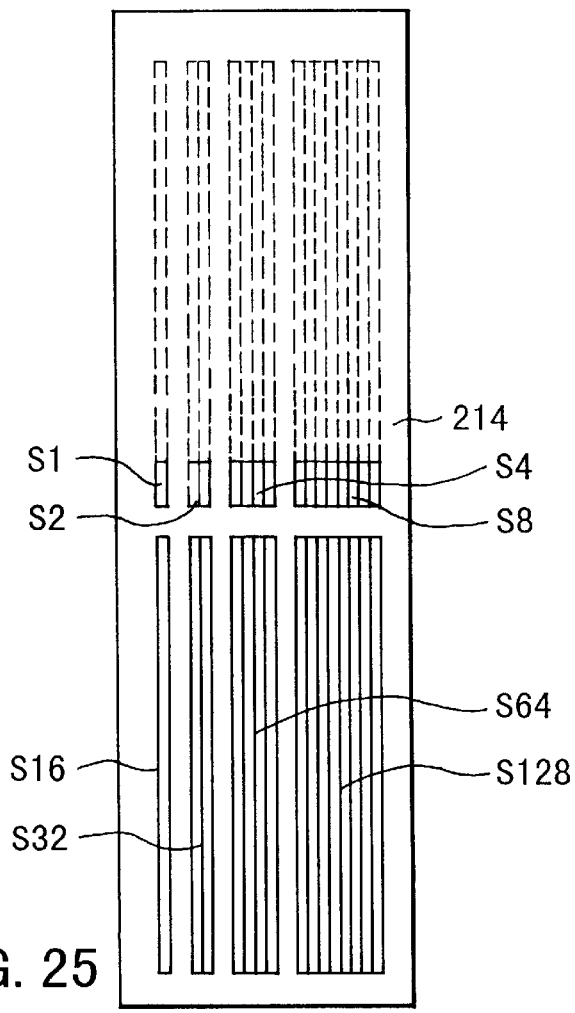

FIG. 23 shows an example in which the width of the shutter unit S1 is set to half the width of the shutter unit S1 of FIG. 22. In this case, the number of shutter units is 10. FIG. 24 shows an example in which the number of shutter units is the same as that in FIG. 23 and the arrangement of the openings is changed. FIG. 25 shows a case wherein the number of shutter units is the same as that in FIG. 20 and the shutter is formed in a line-symmetrical fashion. The structure is designed to make the widths in the lateral direction equal to each other. By making the lateral widths equal to each other, the productivity can be enhanced. The size of the opening is determined by the black matrix 214.

Figure 26:
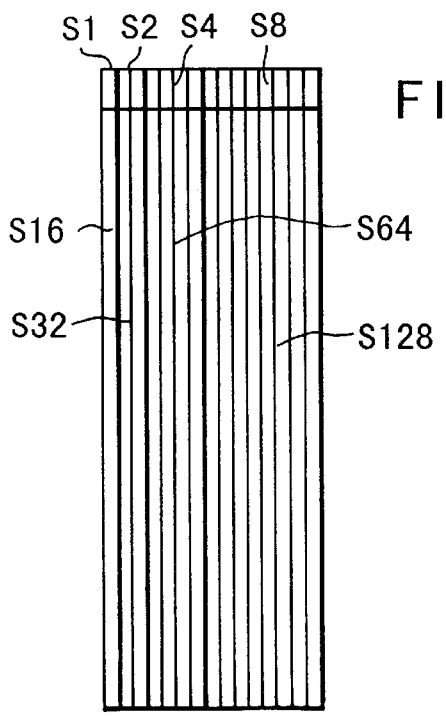

FIG. 26 shows a case wherein the black matrix is not used and the intervals between the sub-pixels are reduced so as to set the aperture ratio to maximum.

Figure 27:
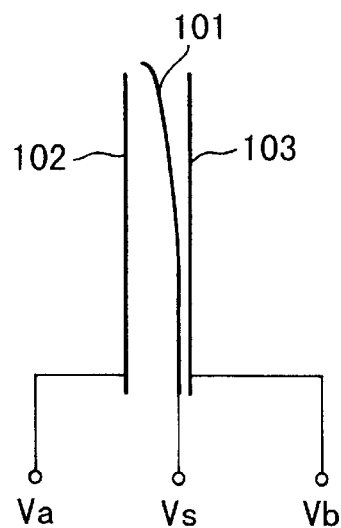
FIG. 27 is a schematic diagram showing an example in which the fixed electrodes are formed of parallel plate type electrodes in the shutter unit of the fourth embodiment.

The light guiding member of the shutter unit is not necessarily required and the fixed electrodes 102, 103 may be a plate-like electrode as shown in FIG. 27.

Next, an embodiment in which not only the gray scale display (dither gray scaling) as described in the fourth embodiment but also the moving picture display can be attained is explained.

[Fifth Embodiment]

In the fifth embodiment, the construction of a basic display device capable of effecting the gray scale display and moving picture display is explained. Two fixed electrodes are used and the feature of the fifth embodiment lies in the potential of the signal line in the holding state.

As an office-use display device, both of the gray scale display and moving picture display are required. In the case of moving picture display, the definition of the image plane itself is not required so high and, in the case of NTSC moving picture, it is sufficient to provide 640×480 pixels. However, in the moving picture display, gray scale display of sufficiently high quality is required.

Figure 28:
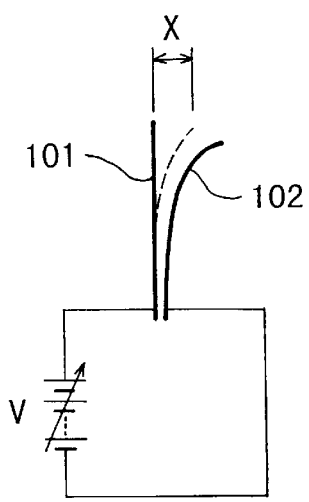
FIG. 28 is a connection diagram showing the connection between a shutter unit and a power supply, for illustrating the principle of a fifth embodiment of this invention.

First, the principle of this invention is explained. FIG. 28 is a basic circuit diagram for illustrating the operation of a movable film shutter. Like the case of FIG. 16 of the third embodiment, the shutter unit has a cantilever type movable film electrode 101 and a rigid fixed electrode 102 having a curved surface (two fixed electrodes are provided in the case of FIG. 16, but in this example, a case wherein one fixed electrode is used is explained). Like the third and fourth embodiments, the fifth embodiment indicates a transmission type display device in which the light source is disposed below the pixels.

Figure 29:
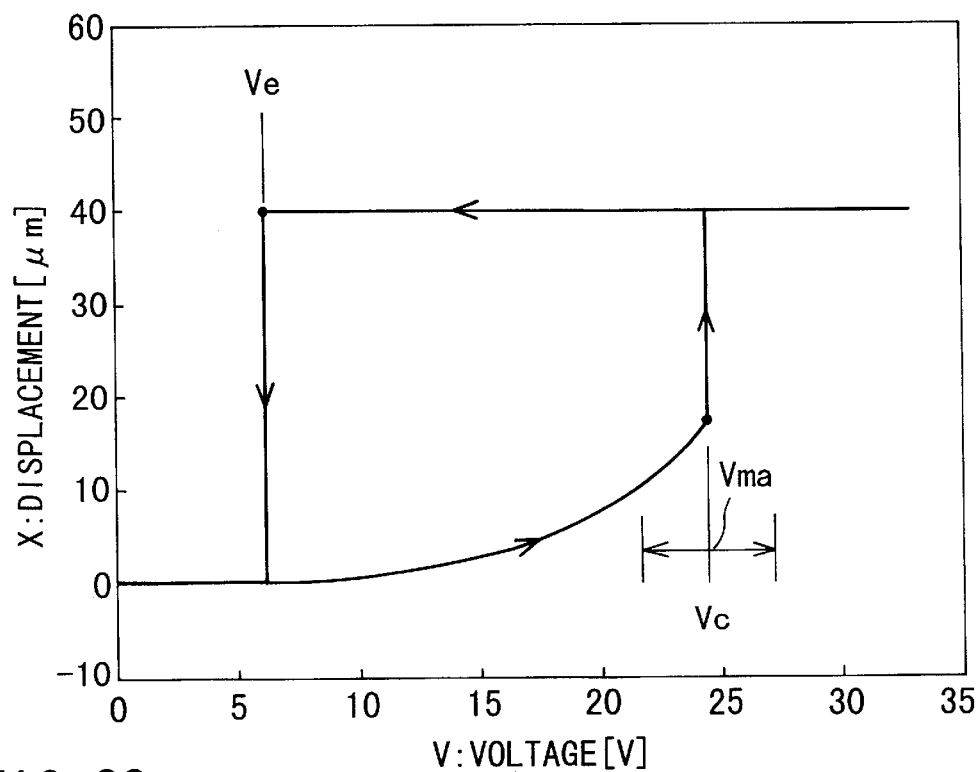
FIG. 29 is a characteristic diagram showing the relation between the displacement X of the top end portion of a movable electrode of the shutter unit of FIG. 28 and an a voltage applied thereto.

A variable power supply V is connected to apply a desired voltage between the movable electrode 101 and the fixed electrode 102. The bottom portion of the movable film electrode is fixed, and when the voltage of the variable power supply V is gradually raised, the top end portion of the movable film electrode 101 is displaced towards the fixed electrode 102. The relation between the displacement X of the top end portion and the application voltage is shown in FIG. 29.

The displacement of the top end portion of the movable film electrode 101 increases with an increase in the application voltage, but when a critical voltage Vc is reached, the top end portion abruptly reaches the surface of the fixed electrode 102. After this, even if the voltage is raised, the displacement is not increased. On the other hand, if the voltage is lowered, the displacement is kept unchanged even when the voltage becomes lower than the voltage Vc and the same state is maintained until the voltage reaches a voltage Ve. When the voltage has reached the voltage Ve, the movable electrode is abruptly separated from the fixed electrode and the displacement is returned to substantially the initial value. That is, the relation between the displacement of the top end portion of the movable electrode and the application voltage exhibits hysteresis.

The values of Vc and Ve are determined by the Young's modulus, thickness, length and width of the movable film electrode, the curved surface shape of the fixed electrode, and the thickness and dielectric factor of the insulating film disposed between the movable film electrode and the fixed electrode. However, if a large number of shutter units are used, the above factors may fluctuate and the values of Vc, Ve will fluctuate. A voltage determined by taking the variation range of Vc into consideration is defined as Vma. Therefore, when a large number of shutter units are used, the maximum value of Vc set by taking the fluctuation thereof into consideration is Vc+Vma and the minimum value of Vc is Vc−Vma.

Figure 30:
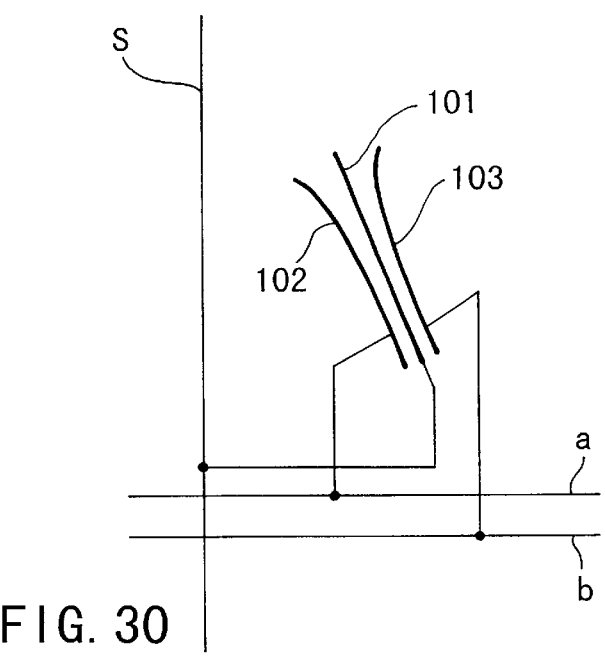
FIG. 30 is a connection diagram for illustrating the connection method of a signal line and scanning lines with respect to the shutter unit of the fifth embodiment.

In FIG. 28, one fixed electrode is provided for one movable electrode. FIG. 30 shows a case wherein two fixed electrodes are provided for one movable electrode. In the case of FIG. 28, the electrostatic force acting on the movable electrode is only in one direction. Therefore, in order to return the bending of the movable electrode to the original state, it is necessary to use the elasticity of the movable electrode itself. When the original state is returned by use of the elasticity, the returning speed is determined by the Young's modulus, thickness and length of the movable film electrode and slight oscillation occurs after returning to the original state.

If two fixed electrodes are provided for one movable electrode as shown in FIG. 30, the electrostatic force can be used in either direction and the shutter speed can be enhanced and the oscillation can be prevented. Therefore, in the following embodiments, the explanation is made for the structure using two fixed electrodes. However, this invention can also be applied to a case wherein a shutter with the structure having the fixed electrodes asymmetrically arranged as shown in FIG. 16 is used.

Figure 31A:
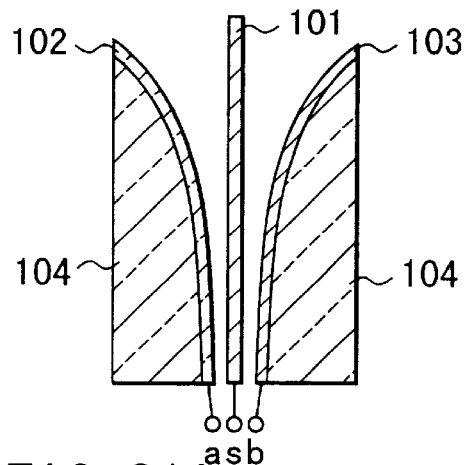
FIGS. 31A to 31C are cross sectional views showing examples of the structure of the shutter unit of the fifth embodiment.

In FIG. 30, the electrodes are schematically drawn but, more specifically, as shown in FIG. 31A, for example, the fixed electrode 102 can be formed of a transparent conductive electrode formed on the curved surface of the transparent light guiding member 104, the fixed electrode 103 can be formed of a metal film formed on the transparent light guiding member 104, and the movable electrode 101 can be formed of a light shielding conductive film. The base on which the fixed electrode 103 is formed is not necessarily transparent. The plane size (pixel size) of the shutter is 50 $\mu$m×50 $\mu$m, for example.

Figure 31B:
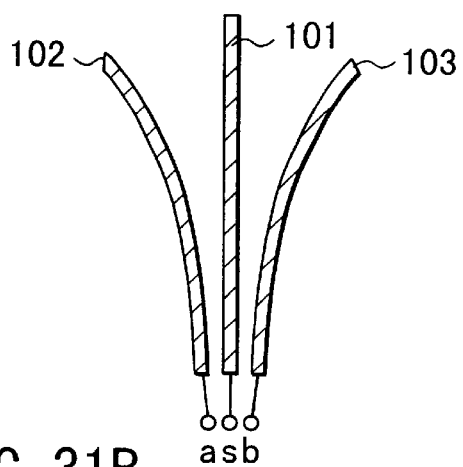
Figure 31C:
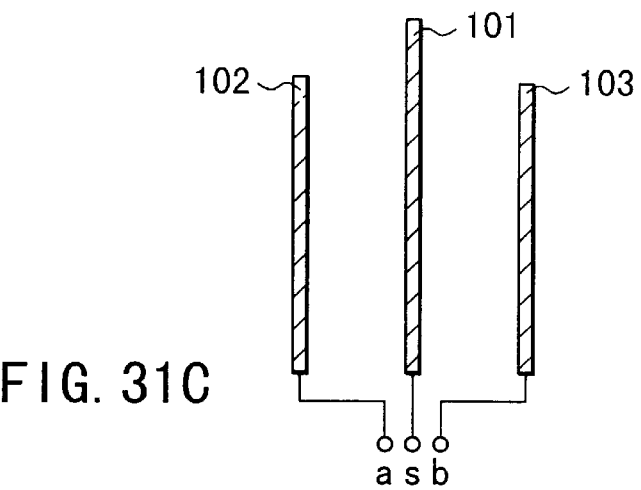

As shown in FIG. 31B, the transparent light guiding member 104 can be omitted. Further, the fixed electrodes 102, 103 are not always required to have the curved surface, and as shown in FIG. 31C, they may be a parallel plate type electrode. However, in this case, a voltage for bending the movable film electrode is made slightly higher.

Further, as shown in FIGS. 30, 31A to 31C, the movable electrode 101 is electrically connected to a signal line s and the fixed electrodes 102, 103 are electrically connected to scanning lines a, b.

Figure 32:
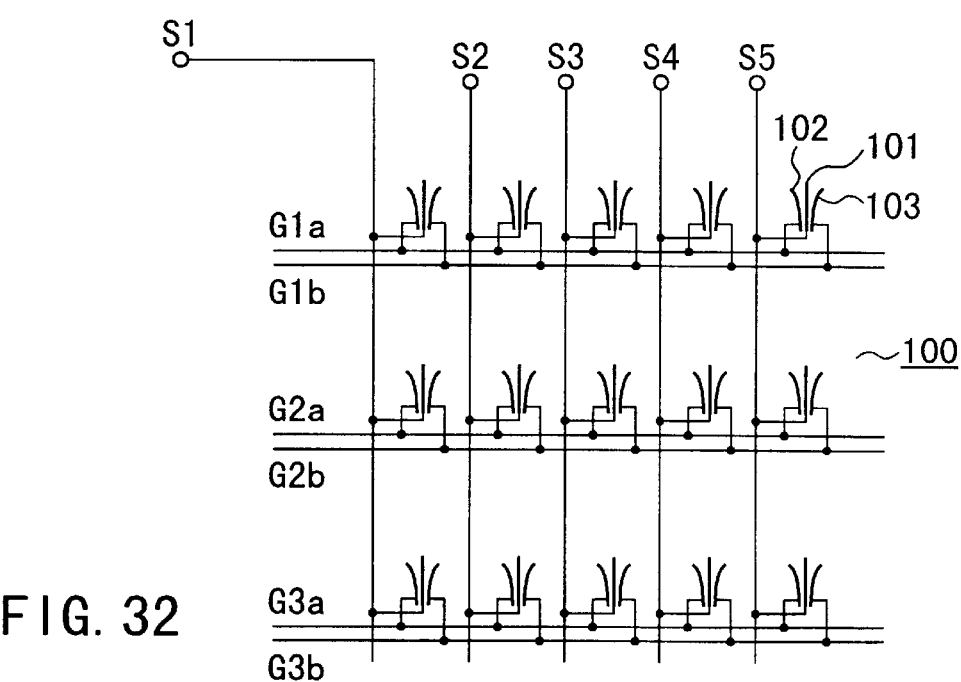
FIG. 32 is a diagram showing the basic connection of the display device of the fifth embodiment.
Figures 33, 35:
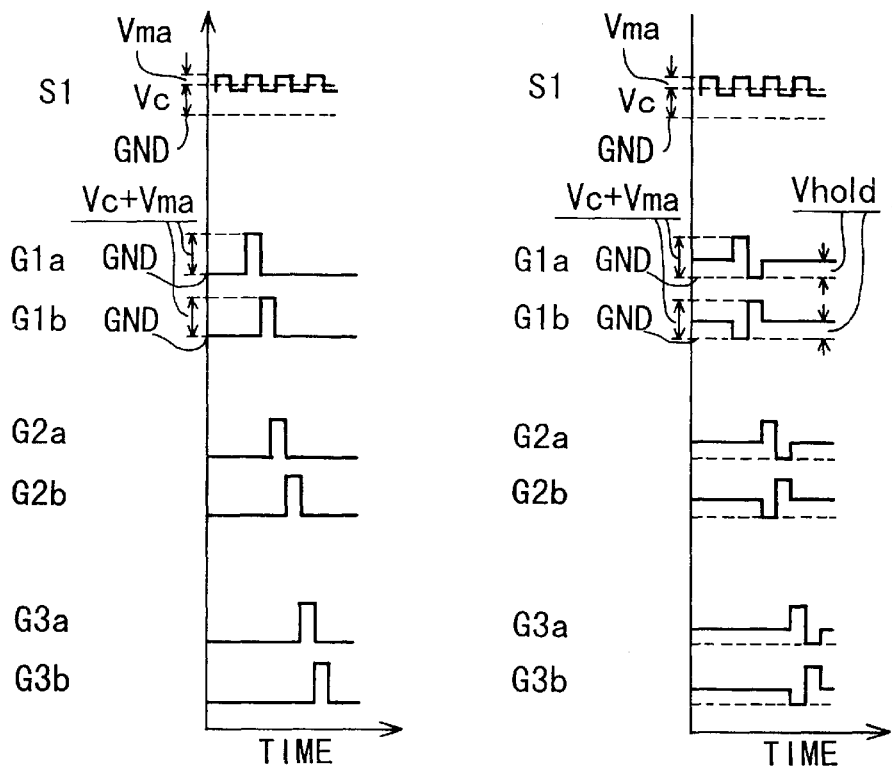
FIG. 33 is a timing chart of various signals for driving the circuit of FIG. 32.
FIG. 35 is a timing chart of various signals in a sixth embodiment.

Next, a driving circuit and driving method for the display device of the fifth embodiment are explained with reference to FIGS. 32 and 33. FIG. 32 is a circuit diagram of this embodiment, and FIG. 33 is a timing chart showing the timings and potentials of various signals supplied to signal lines and scanning lines.

In FIG. 32, a plurality of pixels 100 constructed by a plurality of movable film shutters are arranged in rows and columns. In each of the pixels 100, a cantilever type movable electrode 101 is held between a first fixed electrode 102 and a second fixed electrode 103. Reference symbols S1 to S5 indicate signal lines for transmitting image signals to the respective pixels. G1a, G1b, G2a, G2b, G3a, G3b are scanning lines. Each signal line is electrically connected to the movable electrodes arranged in the vertical direction. Further, the scanning lines are roughly divided into two types of scanning lines a and b, the scanning lines on the a side include G1a, G2a, G3a and the scanning lines on the b side include G1b, G2b, G3b. The two types of scanning lines a and b are electrically connected to the first fixed electrodes 102 and second fixed electrodes 103, respectively.

The signal line is supplied with a pulse wave of an amplitude obtained by adding and subtracting the margin voltage Vma which is determined by taking the fluctuation into consideration to and from the critical voltage Vc, that is, a pulse wave of an amplitude having a high level of (Vc+Vma) and a low level of (Vc−Vma). When the signal line voltage is (Vc+Vma) and the scanning line potentials are set in the write-in state (at the GND level), an image signal is written into the pixel (light is shielded).

Both of the scanning lines are set at the GND potential in the image holding state. The holding state indicates that the image signal is maintained as it is and the pixel is required to hold the state. Since the potentials of the two fixed electrodes are set the same, the movable electrode is attracted to a closer one of the fixed electrodes irrespective of the potential thereof. This is because the electrostatic force is inversely proportional to the square of the distance between the electrodes and the electrostatic force between the movable electrode and a closer one of the fixed electrodes is stronger.

Next, the potentials of the scanning lines when an image signal is written, that is, at the selection time are explained. As described before, the first fixed electrodes 102 are electrically connected to the scanning lines a (which generally represent G1a, G2a, G3a) and the second fixed electrodes 103 are electrically connected to the scanning lines b (which generally represent G1b, G2b, G3b).

First, a case wherein the movable electrode 101 is bent towards the second fixed electrode 103 (light is transmitted) is explained. In this case, it is assumed that the potential of the scanning line a is set at (Vc+Vma) and the potential of the scanning line is set at GND. If the signal line potential is (Vc+Vma), the movable electrode 101 which is electrically connected to the above signal line is attracted towards the second fixed electrode 103 having a sufficiently large potential difference. If the signal line potential is (Vc−Vma), the potential difference is not sufficiently large and the movable electrode 101 cannot be attracted towards the second fixed electrode 103.

Next, a case wherein the movable electrode 101 is bent towards the first fixed electrode 102 (light is shielded) is explained. In this case, the potential of the scanning line a is set to GND and the potential of the scanning line b is set to (Vc+Vma). If the signal line potential is (Vc+Vma), the movable electrode 101 which is electrically connected to the above signal line is attracted towards the first fixed electrode 102 having a sufficiently large potential difference. If the signal line potential is (Vc−Vma), the potential difference is not sufficiently large and the movable electrode 101 cannot be attracted towards the first fixed electrode 102.

Thus, the image signal writing operation or non-writing operation can be selectively effected based on the signal line potential. The relation between various combinations of the scanning line potentials and signal line potentials and the pixel statuses is shown in FIG. 34.

[Sixth Embodiment]

Next, an embodiment in which the stability of the holding state is improved is explained. The circuit diagram of the display device of the sixth embodiment is the same as that of FIG. 32 in the fifth embodiment. The sixth embodiment is different from the fifth embodiment in the potentials of the scanning lines in the holding state.

FIG. 35 is a timing chart showing the timings and potentials of various signals supplied to the signal lines and scanning lines. In the sixth embodiment, a voltage of Vhold is added as a potential in the holding state to the scanning line signal.

Figure 36:
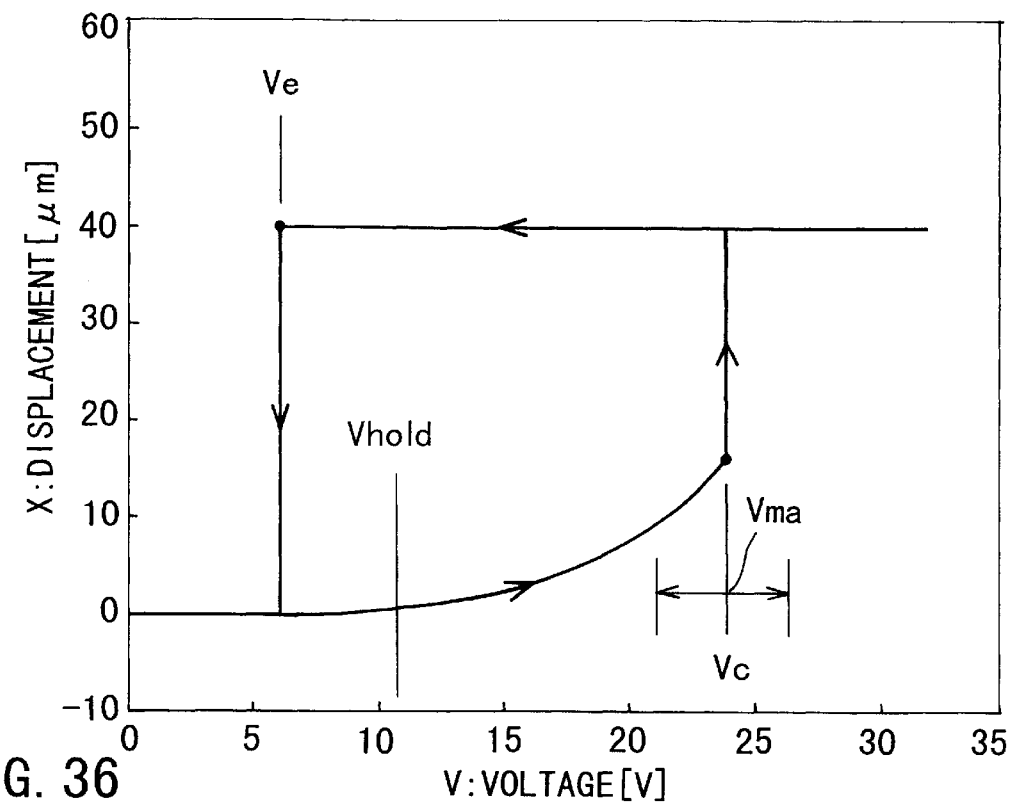
FIG. 36 is a characteristic diagram showing the relation between hold shown in FIG. 35 and Ve shown in FIG. 29.

FIG. 36 is a diagram showing the relation between the displacement X of the top end of the movable electrode and the potential difference between the fixed electrode and the movable electrode explained in FIG. 29 for the display device of the sixth embodiment. Basically, the relation is the same as that of FIG. 29, but the voltage Vhold is set at a voltage higher than the voltage Ve at which the displacement X is abruptly returned to 0.

As described before, in the fifth embodiment, if both of the scanning line potentials in the holding state are set at GND, the movable electrode is always attracted to one of the fixed electrodes. However, by using the driving method as in the sixth embodiment, the scanning line potential in the holding state is set at Vhold which is higher than Ve and the movable electrode will not be abruptly returned to the original position (that is, displacement 0). At Vhold, the movable electrode has two stable states. That is, the movable electrode is set in the stable state even if the movable electrode is set on either of the fixed electrodes.

Therefore, the display device of the present embodiment can maintain the stabler holding state in comparison with the fifth embodiment. The relation between various combinations of the scanning line potentials and signal line potentials and the pixel statuses in the sixth embodiment is shown in FIG. 37.

[Seventh Embodiment]

Next, a seventh embodiment of this invention is explained. The seventh embodiment relates to a display method for selectively attaining the binary high-definition display and the moving picture display of dither gray scaling by use of the structure of the sixth embodiment.

Figure 38:
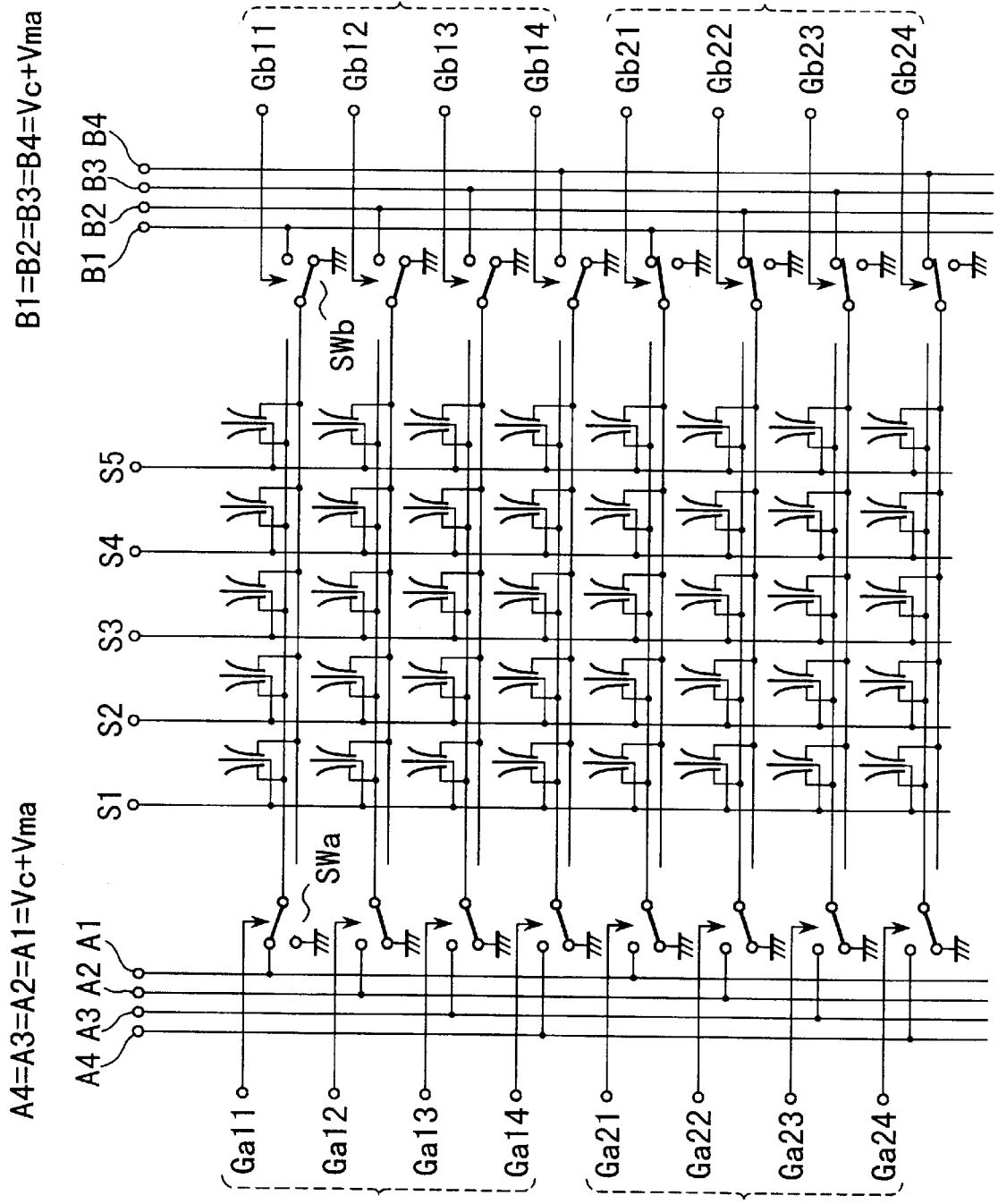
FIG. 38 is a connection diagram showing a display device according to a seventh embodiment of this invention at the time of driving in the high-definition mode.

FIG. 38 is a circuit diagram of a display device according to the seventh embodiment. Scanning lines include two types of scanning lines, that is, scanning lines a (Ga11, Ga12, . . . ) drawn on the left side of the pixel group and scanning lines k (Gb11, Gb12, . . . ) drawn on the right side thereof.

In this embodiment, the scanning lines are divided into groups each including four scanning lines, for example, Ga11 to Ga14, and Ga21 to Ga24 on the a side and Gb11 to Gb14, and Gb21 to Gb24 on the b side. Potentials actually applied to the scanning lines are supplied from reference potential lines A1 to A4 and B1 to B4. Signals supplied from the scanning lines Ga11, Gb11 and the like are signals used for selectively controlling the switching positions of switches SWa and SWb for switching the potentials of the scanning lines to the reference potential line side or GND side.

The first scanning lines (Ga11, Gb11, Ga21, Gb21) in the scanning line groups can be respectively connected to the reference potential line A1 on the a side and to the reference potential line B1 on the b side. Likewise, the second scanning lines (Ga12, Gb12, Ga22, Gb22) can be respectively connected to A2 and B2, the third scanning lines (Ga13, Gb13, Ga23, Gb23) can be respectively connected to A3 and B3, and the fourth scanning lines (Ga14, Gb14, Ga24, Gb24) can be respectively connected to A4 and B4.

Like the fifth and sixth embodiments, each of signal lines is electrically connected to the movable electrodes of the pixels arranged on the same column.

Next, a case wherein the high definition display and the gray scale/moving picture display are effected by use of the display device with the above construction is explained.

(High Definition Mode)

Figure 39:
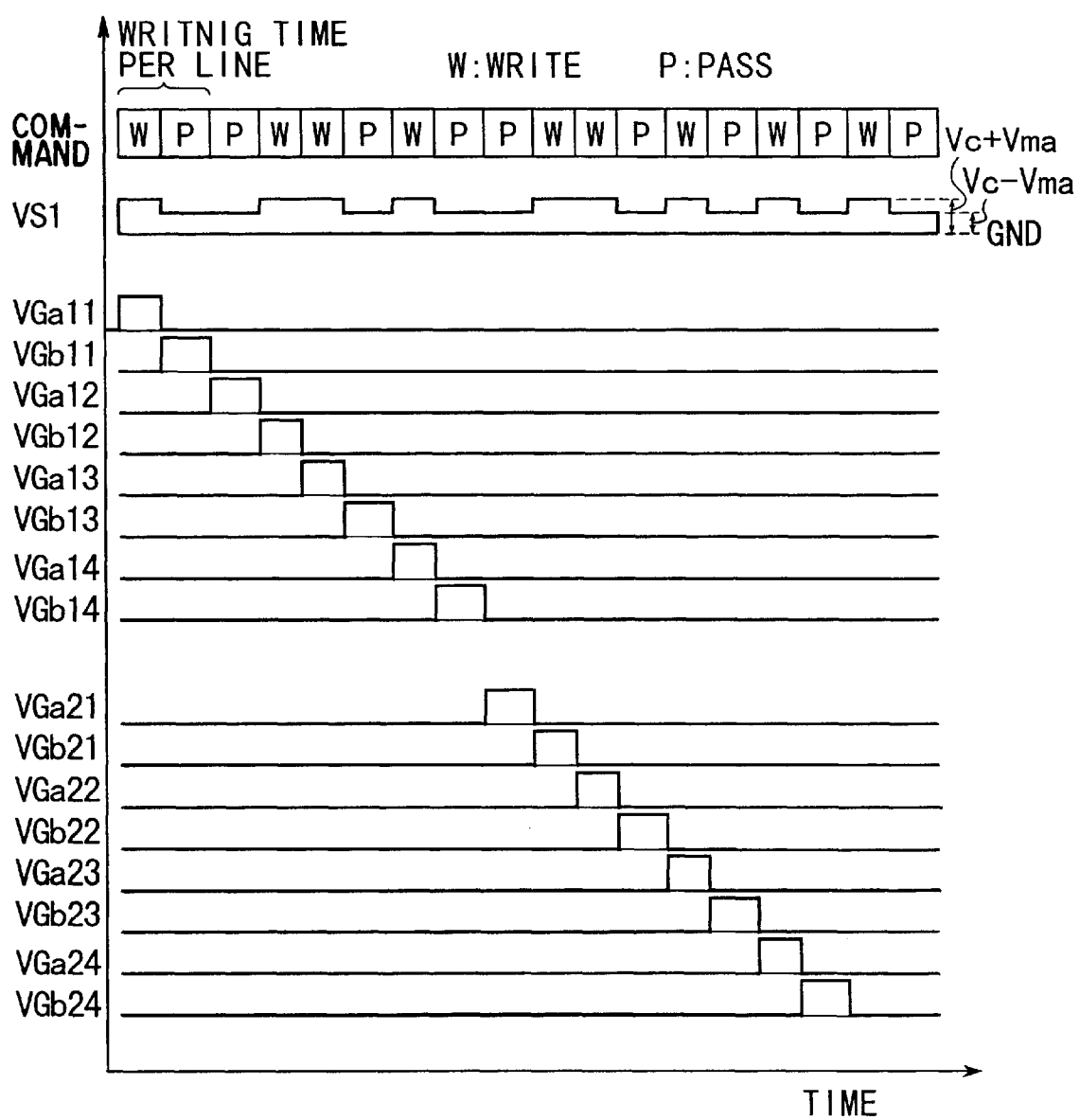
FIG. 39 is a timing chart of various signals for driving in the high-definition mode in the seventh embodiment.

FIG. 38 shows a state of high definition display. In this state, all of the potentials of the reference potential lines are set to (Vc+Vma) and the scanning lines are sequentially set into the write-in state from the upper portion of the image plane irrespective of the grouping of the scanning lines. FIG. 39 is the timing chart used at this time. The procedure is basically the same as that explained in the fifth embodiment. Like the fifth embodiment, the scanning lines a and b are alternately and sequentially turned ON and light transmission or non-transmission is sequentially written into the individual pixel.

In FIG. 39, symbols W and P are indicated as commands, and the commands inform the signal line.of whether the write operation (W) is effected or the write operation is neglected or passed (P) at the time of writing operation of light transmission or non-transmission. Vs1 indicates one example of the potential of the signal line and is set to (VC+Vma) at the write (W) time and (Vc−Vma) at the pass (P) time.

At this time, since the size of one pixel is approximately 50 μm×50 μm as described before, sufficiently high resolution can be attained.

(Moving Picture, Gray Scale Mode)

Figure 40:
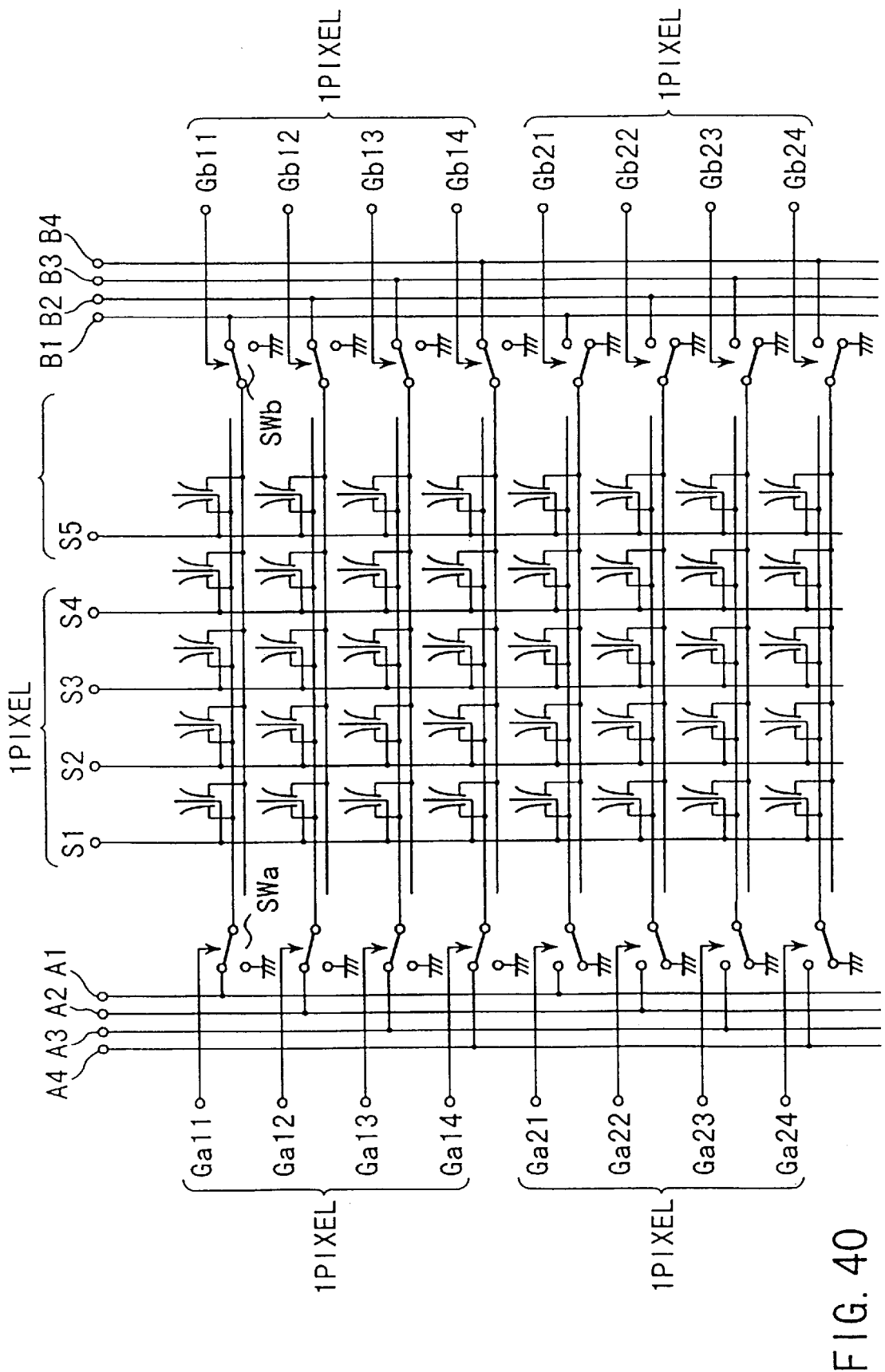
FIG. 40 is a connection diagram showing the display device according to the seventh embodiment of this invention at the time of moving picture driving in the gray-scale mode.

FIG. 40 indicates a circuit state for displaying the moving picture, gray scale. The gray scale display in this embodiment is dither gray scaling display using a plurality of pixels. In this embodiment, 4×4 sub-pixels construct one pixel. That is, 16 sub-pixels construct one pixel. Therefore, a display ability of 16 gray scale levels can be attained. If 10×10 sub-pixels construct one pixel, 100 gray scale levels can be attained. If 640×480 pixels are used, the NTSC moving picture can be displayed.

In this case, if the write operation is effected for each sub-pixel, the write time for one sub-pixel becomes short and a sufficient write operation may not be attained. Therefore, in this embodiment, the write operation is effected for each pixel. That is, if one scanning line pair is made by the two scanning lines a and b connected to the pixels on the same row, four scanning line pairs (eight scanning lines a and b in total) are set into the write state at the same time. Further, four signal lines, for example, the signal lines S1 to S4 are simultaneously driven. In the case of NTSC, the write time assigned to one pixel is 600 μs.

In an example of FIG. 40, the scanning lines Ga11 to Ga14 and Gb11 to Gb14 are connected to the respective reference potential lines and the pixels on the scanning lines are set in the write state. On the other hand, the scanning lines Ga21 to Ga24 and Gb21 to Gb24 are set in the holding state.

Figure 41:
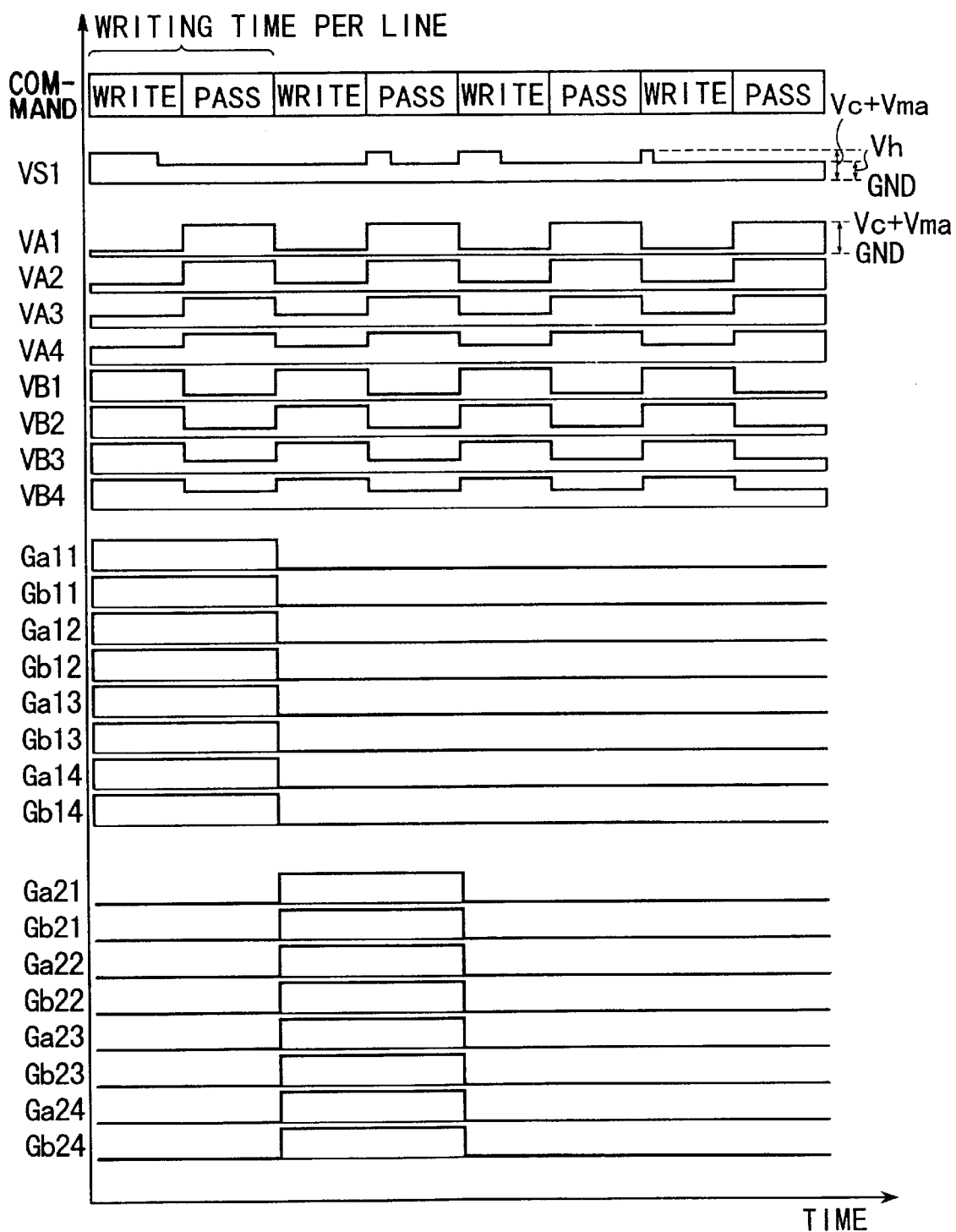
FIG. 41 is a timing chart of various signals with respect to the signals of the reference potential lines at the time of moving picture driving in the gray-scale mode in the seventh embodiment.
Figure 42:
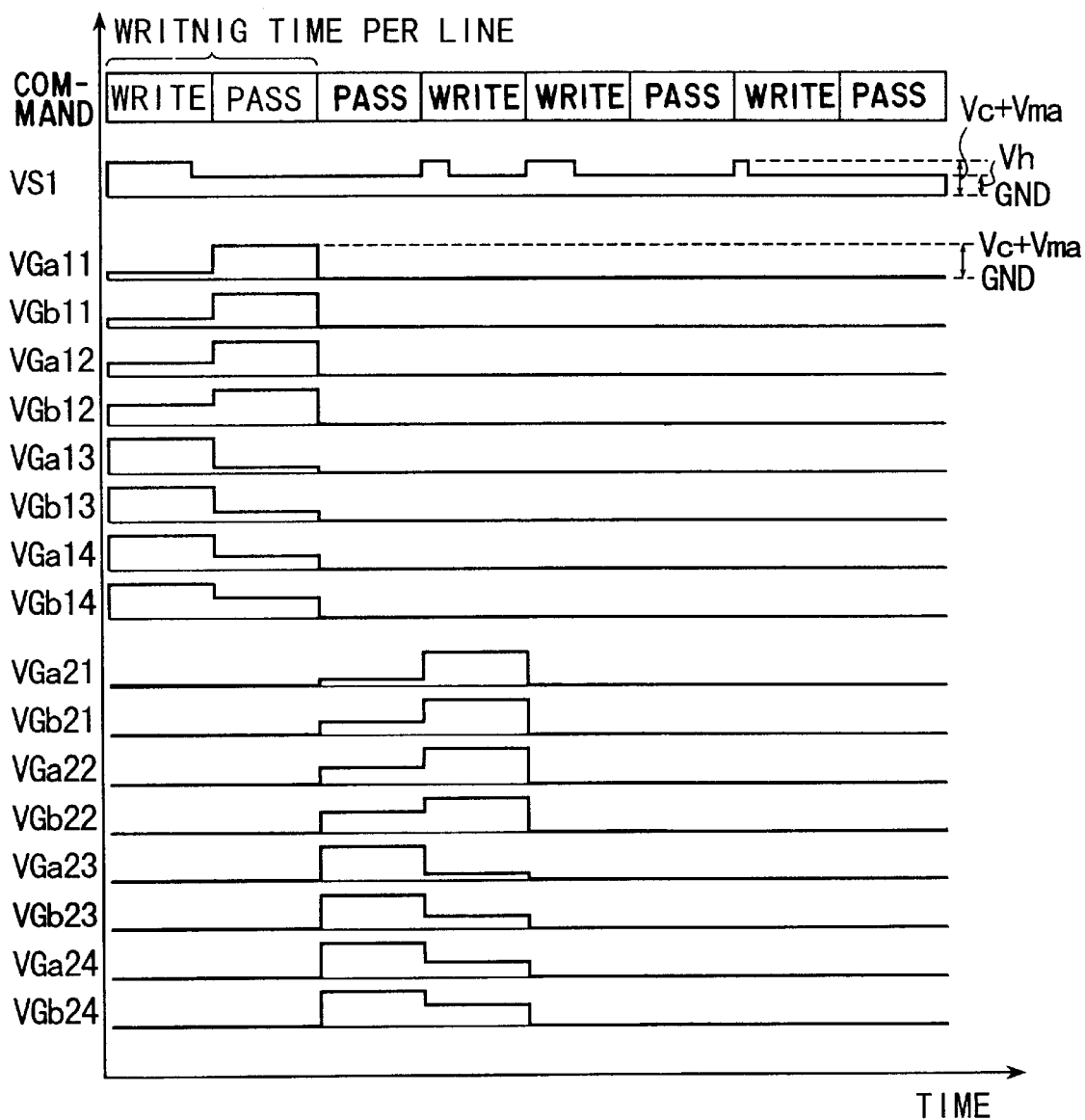
FIG. 42 is a timing chart of various signals with respect to the signals of the scanning lines at the time of moving picture driving in the gray-scale mode in the seventh embodiment.

FIG. 41 is a timing chart of this embodiment. Like FIG. 41, FIG. 42 is also a timing chart and specifically indicates the potentials VG of the scanning lines.

In order to display gray scale, the potentials of the reference potential lines are different in this display state. At the write time of non-transmission of light, the movable electrode is attracted towards the scanning line a, and therefore, the potentials of the reference potential lines B1 to B4 are all set to (Vc+Vma) so as to set all of the potentials of the scanning lines b of the selected pixels to (Vc+Vma).

On the other hand, the potentials of the scanning lines a are positively set to different levels so as to display gray scale. For example, the potentials of the reference potential lines A1 to A4 are set such that A4>A3>A2>A1 and the potentials of the scanning lines a are set such that VGa14>VGa13>VGa12>VGa11. At this time, sub-pixels which are written and sub-pixels which are not written appear in the same pixel depending on the period of time during which the potential of the signal line is maintained at (Vc+Vma). That is, whether the write operation is effected or not is determined by a value obtained by the following expression.

"time during which the potential of the signal line is maintained at (Vc+Vma)"ד the potential difference between the movable electrode and the scanning line".

Therefore, it becomes possible to display gray scale in the pixel depending on the period of time in which the signal line is maintained at (Vc+Vma).

At the write time of light transmission, the potentials of the reference potential lines A1 to A4 are all set to (Vc+Vma). The potentials of the scanning lines b are positively set to different levels to display gray scale. For example, the potentials of the reference potential lines B1 to B4 are set such that B4>B3>B2>B1 and the potentials of the scanning lines b are set such that VGb14>VGb13>VGb12>VGb11.

The signal line potential is set to a potential Vh in a period other than the period of (Vc+Vma). The potential is used to realize Vhold in the sixth embodiment and is a potential for permitting the movable electrode to maintain the state irrespective of the potential of the scanning line.

In the holding state, the potential of the scanning line is changed from GND to Vhold as in the fifth and sixth embodiments.

Figures 43, 44:
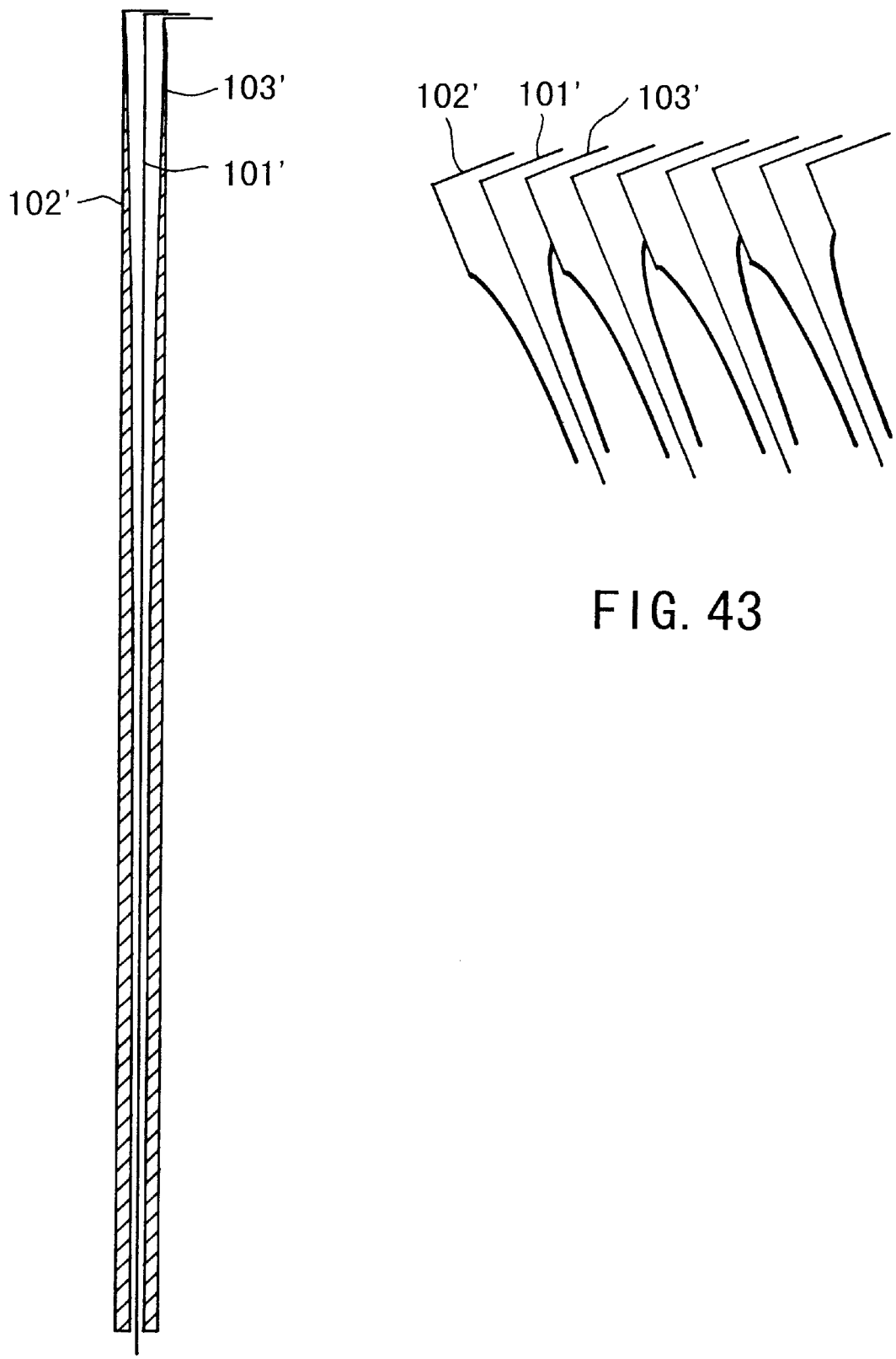
FIG. 43 is a schematic view showing an example of the structure of the shutter unit obtained when the fifth to seventh embodiments are applied to a reflection type display device.
FIG. 44 is a schematic view for illustrating a desirable shape of the reflection type shutter unit.

In the fifth to seventh embodiments, the light transmission type display device is explained, but this invention can be applied to a reflection type display device using shutter sets as shown in FIG. 43. FIG. 43 shows the arrangement of fixed electrodes 102' and 103' having bent top end portions and a movable electrode 101' and corresponds to the shutter set 112 shown in FIG. 17. The fixed electrode 102' of a pixel partly overlaps the fixed electrode 103' of an adjacent pixel.

In the actual display device, the fixed electrodes are thus superposed to enhance the space utilization efficiency.

The top end portion of the electrode is bent at substantially right angles. The top end portion of the movable electrode can conceal itself below the top end portion of one of the fixed electrodes and appear above the top end portion of the other fixed electrode. If the colors of the top end portions of the fixed electrodes and movable electrode are made different, display can be effected by changing the position of the top end portion of the movable electrode. In the case of color image, the top end portions of the movable electrodes are colored with R, G, B and one set of R, G, B constructs one pixel. C, M, Y (Cyan, Magenta, Yellow) may be used in place of R, G, B.

Further, as shown in FIG. 44, the ratio of the length of the actual bent portion to the length of the cantilever or the fixed electrode is desirably made as small as possible. This is because the difference in level in the pixel portion can be suppressed to minimum.

With the above structure, a movable film type display device which can attain both of the high definition image quality which is required in the information displaying reflection type display device and the display of moving picture having gray scale can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
   a plurality of light guiding fixed electrode blocks of a cut-out pie like shape formed of a transparent material, respectively having a plurality of transparent conductive layers selectively formed thereon, and arranged in rows and columns, each having opposing main surfaces and a first, a second and a third side surface, said first side surface being rectangular and connected to said main surfaces, respectively, and said first side surface having a reflector thereon, said second side surface being rectangular and connected to said main surfaces respectively, and connected to said first side surface, said second side surface being substantially perpendicular to said first side surface, said third side surface having a curved rectangular shape connected to said main surfaces, respectively, connected to said first side surface, and connected to said second side surface, said third side surface having one of said transparent conductive layers thereon, and said blocks each guiding light incident from one of said opposing main surfaces and reflected from said first side surface to said curved third surface and emitting the light, said plurality of light guiding fixed electrode blocks, arranged on the same row being formed in one body such that said light guiding fixed electrode blocks are connected to each other through said opposing main surfaces thereof in a light transmissive manner;

a plurality of flexible conductive light shielding plates, respectively and insulatively arranged to face said transparent conductive layers of said light guiding fixed electrode blocks and each of said flexible conductive light shielding plates having one end fixed to a side between said first side surface and said third side surface; and an electrostatic force generating circuit applying an independent potential difference between said conductive light shielding plates and said transparent conductive layers, respectively, to generate electrostatic force between said transparent conductive layers and said conductive light shielding plates, respectively;

wherein each of said conductive light shielding plates is bent according to the electrostatic force along said curved third side surface of a corresponding one of said light guiding fixed electrode blocks when the potential difference is applied between one of said conductive light shielding plates and a corresponding one of said transparent conductive layers.

2. A display device according to claim 1, wherein a light shielding frame is formed on a periphery of each of said transparent conductive layers of said light guiding fixed electrode blocks.

3. A display device comprising:

a plurality of light guiding fixed electrode blocks of a cut-out pie like shape formed of a transparent material, respectively having a plurality of transparent conductive layers selectively formed thereon, and arranged in rows and columns, each having opposing main surfaces and a first, a second and a third side surface, said first side surface being rectangular and connected to said main surfaces, respectively, and said first side surface having a reflector thereon, said second side surface being rectangular and connected to said main surfaces, respectively, and connected to said first side surface, said second side surface being substantially perpendicular to said first side surface, said third side surface having a curved rectangular shape connected to said main surfaces, respectively, connected to said first side surface, and connected to said second side surface, said third side surface having one of said transparent conductive layers thereon, and said blocks each guiding light incident from one of said opposing main surfaces and reflected from said first side surface to said curved third surface and emitting the light, said plurality of transparent conductive layers arranged on the same row being continuously formed in one sheet;

a plurality of flexible conductive light shielding plates, respectively and insulatively arranged to face said transparent conductive layers of said light guiding fixed electrode blocks in one to one correspondence and each having one end fixed to a side between said first side surface and said third side surface; and an electrostatic force generating circuit applying an independent potential difference between said conductive light shielding plates and said transparent conductive layers, respectively, to generate electrostatic force between said transparent conductive layers and said conductive light shielding plates, respectively;

wherein each of said conductive light shielding plates is bent according to the electrostatic force along said curved third side surface of a corresponding one of said light guiding fixed electrode blocks when the potential difference is applied between one of said conductive light shielding plates and a corresponding one of said transparent conductive layers.

4. A display device according to claim 3, wherein a light shielding frame is formed on a periphery of each of said transparent conductive layers of said light guiding fixed electrode blocks.

5. A display device comprising:

a plurality of pixels arranged in rows and columns, each being constructed of a plurality of sub pixels, each of said sub pixels being constructed of at least one shutter unit, said shutter unit comprising a light guiding fixed electrode block of a cut-out pie like shape formed of a transparent material, having a transparent fixed electrode selectively formed thereon, and having opposing main surfaces and a first, a second and a third side surface, said first side surface being rectangular and connected to said main surfaces, respectively, and said first side surface having a reflector thereon, said second side surface being rectangular and connected to said main surfaces, respectively, and connected to said first side surface, said second side surface being substantially perpendicular to said first side surface, said third side surface having a curved rectangular shape connected to said main surfaces, said first side surface and said second side surface, said third side surface having said transparent fixed electrode thereon, and said block guiding light incident from one of said opposing main surfaces and reflected from said first side surface to said curved third surface and emitting the light, said light guiding fixed electrode block is arranged on the same row in the same sub pixel and formed in one body with other light guiding fixed electrode blocks such that each light guiding fixed electrode block is connected to each other through said opposing main surfaces thereof in a light transmissive manner;

a light shielding movable electrode, insulatively arranged to face said transparent fixed electrode of said light guiding fixed electrode block and having one end fixed to a side between said first side surface and said third side surface, to form a light passing portion together with said light guiding fixed electrode block; and an electrostatic force generator generating electrostatic force between said fixed electrode and said movable electrode to bend said movable electrode and shield the light passing portion of said optical shutter unit, wherein a plurality of fixed electrodes are electrically connected to each other in each of said sub pixels, a plurality of movable electrodes are electrically connected to each other in each of said sub pixels, said electrical force generator simultaneously generates electrostatic force between said fixed electrode and a corresponding movable electrode to simultaneously shield said light passing portion of said optical shutter unit by bending said movable electrode according to the electrostatic force along said curved third side surface of said light guiding fixed electrode block, and said electrostatic force generator selectively generates electrostatic force to said optical shutter unit of said sub pixels, thereby displaying gray scaling.

6. A display device according to claim 5, wherein an amount of light passing through each of said pixels is controlled according to the number of closed optical shutter units among said plurality of sub pixels in each of said plurality of pixels.

7. A display device according to claim 5, wherein the sizes of said plurality of optical shutter units contained in each of said plurality of pixels are made different from one another and an amount of light passing through each of said pixels is controlled by selectively closing said plurality of optical shutter units of said sub pixels.

8. A display device according to claim 7, wherein a ratio of respective amounts of light passing through said plurality of sub pixels contained in each of said plurality of pixels other than the minimum amount to the minimum amount is set to an integral power of 2.

9. A display device comprising:
a plurality of optical shutters arranged in rows and columns, each of said plurality of optical shutters including:
a light shielding movable film electrode of cantilever form having one end fixed; and
a first and a second fixed electrode arranged to face said movable electrode and having said movable electrode insulatively held with a first and a second insulating member interposed therebetween, said first fixed electrode having a portion separated apart from said movable electrode to form a light path;
a plurality of first scanning lines driven by a first voltage source and arranged for the respective rows, each of said plurality of first scanning lines being connected to said first fixed electrode of each of corresponding ones of said plurality of optical shutters to apply a desired voltage thereto;
a plurality of second scanning lines driven by a second voltage source and arranged for the respective rows, each of said plurality of second scanning lines being connected to said second fixed electrode of each of corresponding ones of said plurality of optical shutters to apply a desired voltage thereto; and
a plurality of signal lines driven by a third voltage source and arranged for the respective columns, each of said plurality of signal lines being connected to said movable electrode of each of corresponding ones of said plurality of optical shutters to apply a desired voltage thereto;
wherein said third voltage source supplies a voltage obtained by adding a preset marginal voltage V2 to V1 to said movable electrode, when a potential which permits said movable electrode to first reach said first fixed electrode via said first insulating member is set to V1 in a case where the potential between said first fixed electrode and said movable electrode is gradually raised, said first voltage source supplies one of a voltage obtained by adding V1 to V2 and a ground voltage to said first fixed electrode, said second voltage source supplies the other one of the voltage obtained by adding V1 to V2 and the ground voltage to said second fixed electrode, and said movable electrode is attracted towards one of said first and said second fixed electrode according to a larger one of the potential difference with respect to said first and said second fixed electrode based on a difference between the electrostatic forces to open/close the light path, when a potential at which said movable film electrode is first separated apart from one of said first and second fixed electrode in a case where the potential difference between said movable electrode and said one of said first and said second fixed electrode is gradually lowered from V1 is set to V3 and a potential which is higher than V3 and lower V1 is set to V4, then a state in which said movable electrode is attracted to said one of said first and said second fixed electrode is maintained by setting a potential of said first and said second fixed electrode to V4, said plurality of first scanning lines are divided into a plurality of groups each including k (k is an integer equal to or larger than 2) scanning lines, said first scanning lines of k contained in an arbitrary one of said plurality of groups are electrically connected to first reference potential lines of k via first changeover switches each having a switching function of connecting said first scanning line to a ground line, and said plurality of second scanning lines are divided into a plurality of groups each including k scanning lines in correspondence to said plurality of first scanning lines and said second scanning lines of k contained in an arbitrary one of said plurality of groups are electrically connected to second reference potential lines of k via second changeover switches each having a switching function of connecting said second scanning line to the ground line, and said first scanning lines of k contained in the arbitrary one of said plurality of groups are respectively connected to said first reference potential lines of k having a plurality of potentials higher than a ground potential and lower than V1 via said changeover switches, said second scanning lines of k corresponding to said first scanning line of k are respectively connected to said second reference potential lines of k having a potential of (V1+V2), and the light is selectively shielded in said plurality of optical shutters contained in the arbitrary one of said plurality of optical shutters according to time during which signal lines selected among said plurality of signal lines are kept at the potential of (V1+V2).

10. A display device according to claim 9, wherein said second fixed electrode has a symmetrical structure with said first fixed electrode with respect to said movable electrode and a potential which permits said movable electrode to first reach said second fixed electrode via said second insulating member is substantially equal to V1 in said first fixed electrode in a case where the potential difference between said second fixed electrode and said movable electrode is gradually raised.

11. A display device according to claim 9, wherein said second scanning lines of k contained in the arbitrary one of said plurality of groups are respectively connected to said second reference potential lines of k having a plurality of potentials higher than a ground potential and lower than V1 via said changeover switches, said first scanning lines of k corresponding to said second scanning lines of k are respectively connected to said first reference potential lines of k having a potential of (V1+V2), and the light is selectively passed in said plurality of optical shutters contained in the arbitrary one of said plurality of groups according to time during which signal lines selected among said plurality of signal lines are kept at the potential of (V1+V2).

12. A display device according to claim 9, wherein said movable electrode is attracted to said first fixed electrode to shield the light when a product of a potential difference between said movable electrode and said second fixed electrode by time during which arbitrary signal lines selected from said plurality of signal lines are set at a potential of (V1+V2) reaches a preset value or more in said plurality of optical shutters contained in the arbitrary one of said plurality of groups.

13. A display device according to claim 9, wherein an amount of the light passing through said plurality of optical shutters contained in the arbitrary one of said plurality of groups is changed according to time during which arbitrary signal lines selected from said plurality of signal lines are kept at a potential of (V1+V2).

14. A display device according to claim 9, wherein only those of said plurality of optical shutters connected to arbitrary signal lines selected from said plurality of signal lines in which the potential difference between said movable electrode and said first fixed electrode is larger than a preset potential difference in said plurality of optical shutters contained in the arbitrary one of said plurality of groups are set into a light passing state.

* * * * *